(12) United States Patent
Lee et al.

(10) Patent No.: US 11,849,331 B2
(45) Date of Patent: Dec. 19, 2023

(54) DEVICE AND METHOD FOR POLICY MANAGEMENT OF USER EQUIPMENT IN WIRELESS COMMUNICATION SYSTEM

(71) Applicant: Samsung Electronics Co., Ltd., Suwon-si (KR)

(72) Inventors: Jicheol Lee, Suwon-si (KR); Kisuk Kweon, Suwon-si (KR); Sangjun Moon, Suwon-si (KR); Jungshin Park, Suwon-si (KR); Beomsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/044,091

(22) PCT Filed: Apr. 5, 2019

(86) PCT No.: PCT/KR2019/004059
§ 371 (c)(1),
(2) Date: Sep. 30, 2020

(87) PCT Pub. No.: WO2019/194633
PCT Pub. Date: Oct. 10, 2019

(65) Prior Publication Data
US 2021/0037380 A1      Feb. 4, 2021

(30) Foreign Application Priority Data

Apr. 5, 2018  (KR) .................. 10-2018-0039949
Oct. 4, 2018  (KR) .................. 10-2018-0118525

(51) Int. Cl.
*H04W 8/02*      (2009.01)
*H04W 12/08*     (2021.01)
(Continued)

(52) U.S. Cl.
CPC ............. *H04W 12/69* (2021.01); *H04W 8/02* (2013.01); *H04W 12/08* (2013.01); *H04W 60/00* (2013.01)

(58) Field of Classification Search
CPC ... H04W 12/0051; H04W 8/02; H04W 12/08; H04W 60/00; H04W 68/00;
(Continued)

(56) References Cited

U.S. PATENT DOCUMENTS 11,470,657 B2 * 10/2022 Youn ................. H04W 8/08
11,582,596 B2 *  2/2023 Tang ................. H04W 8/205
(Continued)

FOREIGN PATENT DOCUMENTS

| KR | 10-2019-0116894 | 10/2019 |
|----|-----------------|---------|
| WO | 2017142362 A1   | 8/2017  |
| WO | 2019/192672 A1  | 10/2019 |

OTHER PUBLICATIONS

3rd Generation Partnership Project; Technical Specification Group Services and System Aspects; Procedures for the 5G System; Stage 2, (Release 15), Mar. 2018, XP051535224.
(Continued)

*Primary Examiner* — Khawar Iqbal
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An operating method of a policy control function (PCF) node in a wireless communication system, according to various embodiments of the present disclosure, comprises the steps of: determining, on the basis of preset conditions, whether to transmit a user equipment (UE) policy; transmitting a message including the UE policy; and receiving information
(Continued)

related to a result of a policy section (PS) operation performed by a UE on the basis of the UE policy.

10 Claims, 19 Drawing Sheets

(51) Int. Cl.
*H04W 12/69* (2021.01)
*H04W 60/00* (2009.01)

(58) Field of Classification Search
CPC ..... H04W 68/005; H04W 12/69; H04W 8/06; H04W 8/08; H04W 28/02; H04W 88/14; H04L 67/306
See application file for complete search history.

(56) References Cited

U.S. PATENT DOCUMENTS

| | | | |
|---|---|---|---|
| 2015/0188810 | A1 | 7/2015 | Salkintzis |
| 2018/0324577 | A1* | 11/2018 | Faccin .................. H04W 76/27 |
| 2019/0037636 | A1 | 1/2019 | Kim et al. |
| 2019/0053308 | A1* | 2/2019 | Castellanos Zamora .................... H04L 65/1016 |
| 2019/0268835 | A1* | 8/2019 | Shan ...................... H04W 48/16 |
| 2019/0342851 | A1* | 11/2019 | Shan ...................... H04W 12/06 |
| 2020/0120487 | A1* | 4/2020 | Tang ................. H04M 15/8044 |
| 2020/0154350 | A1* | 5/2020 | Dao ....................... H04W 48/18 |
| 2020/0367052 | A1* | 11/2020 | Tang .................... H04W 48/18 |
| 2020/0382605 | A1* | 12/2020 | Ouyang ................ H04W 40/34 |
| 2021/0029628 | A1* | 1/2021 | Kim ...................... H04W 48/18 |
| 2021/0037380 | A1* | 2/2021 | Lee ....................... H04W 28/02 |
| 2021/0105697 | A1* | 4/2021 | Xu ......................... H04W 76/15 |
| 2021/0120596 | A1* | 4/2021 | Youn ..................... H04W 76/12 |
| 2021/0152615 | A1* | 5/2021 | Karampatsis ......... H04W 40/22 |
| 2021/0168584 | A1* | 6/2021 | Li ........................... H04W 48/20 |
| 2021/0168665 | A1* | 6/2021 | Salkintzis ........... H04L 63/0428 |
| 2021/0274340 | A1* | 9/2021 | Sun ....................... H04W 48/20 |
| 2021/0329541 | A1* | 10/2021 | Salkintzis ............. H04W 76/16 |

OTHER PUBLICATIONS

ZTE Corporation, CATR, Application-based traffic identification, S2-163262, Jul. 4-6, 2016, Vienna, Austria.
3rd Generation Partnership Project; Technical Specification Group Services and System Aspects; Policy and Charging Control Framework for the 5G System; Stage 2, (Release 15), Mar. 2018, XP051450528.
European Search Report dated May 17, 2021, issued in European Patent Application No. 19780552.6.
3GPP S2-187886, 3GPP TSG SA WG2 Meeting #128, S2-187886, Sophia Antipolis, France, Aug. 20-24, 2018.
Set the applicatione ID, https://developer.apple.com/library/archive/documentation/General/Conceptual/DevPedia-CocoaCore/AppID.html, updated Aug. 25, 2020.
APP ID, https://developer.apple.com/library/archive/documentation/General/Conceptual/DevPedia-CocoaCore/AppID.html, download date: Sep. 22, 2020.
TS 23.501, 3rd Generation Partnership Project; Technical Specification Group Services and System Aspects; System architecture for the 5G System (5GS); Stage 2, Sep. 2020.
TS 24.501, 3rd Generation Partnership Project; Technical Specification Group Core Network and Terminals; Non-Access-Stratum (NAS) protocol for 5G System (5GS), Stage 3; Sep. 2020.
TS 33.501; 3rd Generation Partnership Project; Technical Specification Group Services and System Aspects; Security architecture and procedures for 5G system, Sep. 2020.
3GPP TSG-SA2 Meeting #129; S2-1811503; S2-1811503, Dongguan, China, Oct. 15-19, 2018.
SA WG2 Meeting #S2-129; S2-1810628, S2-1810628, Dongguan, China, Oct. 15-19, 2018.
SA WG2 Meeting #S2-129bis S2-1813114, West Palm Beach, USA, Nov. 26-30, 2018.
3GPP TSG-SA WG2 Meeting #129bis; S2-1813001; West Palm Beach, USA, Nov. 26-30, 2018.
3GPP S2-181612;3GPP TSG-SA WG2 Meeting #126; Montreal, Canada, Feb. 26-Mar. 2, 2018.
3GPP S2-182623; 3GPP TSG-SA WG2 Meeting #126; Montreal, Canada, Feb. 26-Mar. 2, 2018.
3GPP S2-182608;3GPP TSG-SA WG2 Meeting #126; Montreal, Canada Feb. 26-Mar. 2, 2018.
3GPP TS 23.503; 3rd Generation Partnership Project; Technical Specification Group Services and System Aspects; Policy and charging control framework for the5G System (5GS); Stage 2; Sep. 2020.
Extended European Search Report dated Apr. 19, 2023, issued in European Patent Application No. 23157630.7.
Ericsson et al., UE policies granularity and UE assistance for policy evaluation, S2-181399, 3GPP TSG-SA WG2 Meeting #125, Gothenburg, Sweden, Jan. 22-26, 2018.
3rd Generation Partnership Project; Technical Specification Group Services and System Aspects; Procedures for the 5G System; Stage 2 (Release 15), 3GPP TS 23.502 V15.1.0 (Mar. 2018).
3rd Generation Partnership Project; Technical Specification Group Core Network and Terminals; Study on CT WG3 Aspects of 5G System Phase 1; (Release 15), 3GPP TR 29.890 V15.1.0 (Mar. 2018).
Chinese Office Action dated Sep. 1, 2023, issued in Chinese Application No. 201980036940.7.
Korean Office Action dated Oct. 23, 2023, issued in Korean Application No. 10-2018-0118525.

\* cited by examiner

| 8 | 7 | 6 | 5 | 4 | 3 | 2 | 1 | |
|---|---|---|---|---|---|---|---|---|
| LTI | SNPI | AAE | FEI | \multicolumn{4}{c|}{reserved} | | octet 1 |
| \multicolumn{8}{|c|}{Selective sequence number of policy container (SNPI is 1)} | octet 2 |
| \multicolumn{8}{|c|}{Number of policy section IEs} | octet 3 |
| \multicolumn{8}{|c|}{Policy section identifier (first)} | octet 4 |
| | | | | | | | | octet 5 |
| \multicolumn{8}{|c|}{Contents of policy section entry (first) (URSP rule or ANDSP rule)} | octet 6~X |
| \multicolumn{8}{|c|}{Policy section identifier (second)} | octet X+1 |
| \multicolumn{8}{|c|}{Contents of policy section entry (second) (URSP rule or ANDSP rule)} | |
| \multicolumn{8}{|c|}{...} | ... |
| \multicolumn{8}{|c|}{Policy section identifier (n-th)} | octet Z+1, octet Z+2 |
| \multicolumn{8}{|c|}{Contents of policy section entry (n-th) (URSP rule or ANDSP rule)} | ... |

FIG.11

DEVICE AND METHOD FOR POLICY MANAGEMENT OF USER EQUIPMENT IN WIRELESS COMMUNICATION SYSTEM

TECHNICAL FIELD

The disclosure relates to a wireless communication system and, more specifically, to a device and a method for policy management of a user equipment (UE) in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

User equipment (UE) may operate based on a policy designated by an operator. In order to the proper operation of UE, UE policy management for determining a UE policy, distributing the UE policy, and enforcing the UE policy is required.

DISCLOSURE OF INVENTION

Technical Problem

Therefore, various embodiments of the disclosure provide a device and a method for policy management of a user equipment.

Various embodiments of the disclosure provide a device and a method for transferring, to a user equipment (UE), a policy of UE including an access network discovery & selection policy (ADNSP) and a user equipment route selection policy (URSP) which are designated by an operator, and enforcing the transferred UE policy by the UE.

Various embodiments of the disclosure provide a device and a method for transmitting a message including a policy operation (addition, replacement, removal, and/or activation of a policy).

Various embodiments of the disclosure provide a device and a method for enforcing, in a UE, a UE policy designated by an operator regardless of a user preference of the UE.

Various embodiments of the disclosure provide a device and a method for enforcing a UE policy without disconnection of an application service, or enforcing the UE policy even if the service gets disconnected.

Various embodiments of the disclosure provide a device and a method for designating whether or not to allow non-seamless offloading and whether or not to prefer same, with respect to each application.

Various embodiments of the disclosure provide a device and a method for detecting an operating system identifier (OSId) required for selecting a traffic descriptor suitable for an operating system of a UE by a UE policy server (e.g. a policy control function node (PCF)) of an operator.

Solution to Problem

According to various embodiments of the disclosure, an operating method of a policy control function (PCF) node in a wireless communication system includes: determining, based on a pre-configured condition, whether to transmit a user equipment (UE) policy; transmitting a message including the UE policy; and receiving information relating to a result of a policy section (PS) operation performed based on the UE policy by a UE.

According to various embodiments of the disclosure, an operating method of a UE in wireless communication system includes: receiving a message including a UE policy; performing a PS operation relating to at least one PS in which the UE policy is included; and transmitting information relating to a result of the PS operation.

According to various embodiments of the disclosure, a PCF node in a wireless communication system includes: a controller configured to determine, based on a pre-configured condition, whether to transmit a user equipment (UE) policy; and a communication unit configured to transmit a message including the UE policy, and receive information relating to a result of a PS operation performed based on the UE policy by a UE.

According to various embodiments of the disclosure, a UE in wireless communication system includes: a communication unit configured to receive a message including a UE policy; and a controller configured to perform a PS operation relating to at least one PS in which the UE policy is included. The communication unit transmits information relating to a result of the PS operation.

Advantageous Effects of Invention

According to a device and a method according to various embodiments of the disclosure, an operator can transfer a user equipment (UE) policy from a policy control function (PCF) node to a UE through an access management function (AMF) node, and the UE can perform an operation relating to a UE policy received from the PCF node of the operator.

According to a device and a method according to various embodiments of the disclosure, an operator can enforce a policy ignoring a user configuration of a UE.

According to a device and a method according to various embodiments of the disclosure, a UE can enforce a UE policy without disconnection of a service related to application traffic of the UE, based on a UE policy, or can instantly enforce a UE policy in spite of occurrence of service disconnection.

According to a device and a method according to various embodiments of the disclosure, a traffic path can be selected according to whether to allow non-seamless offloading and whether to prefer same, with respect to each application.

According to a device and a method according to various embodiments of the disclosure, in various embodiments of the disclosure, an operating system identifier (OSId) required for selecting a traffic descriptor suitable for an operating system of a UE is detected by a UE policy server (e.g. a policy control function node (PCF)) of an operator. Therefore, it can be prevented that the PCF node transfers, to the UE, all application program identifiers (operating system application identifiers (OSAppId)) operating in an operating system not used by the UE, to express a traffic descriptor relating to one application program.

Effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

FIG. 11 illustrates a configuration of a UE policy container in a wireless communication system according to various embodiments of the disclosure;

BEST MODE FOR CARRYING OUT THE INVENTION

Figure 1:
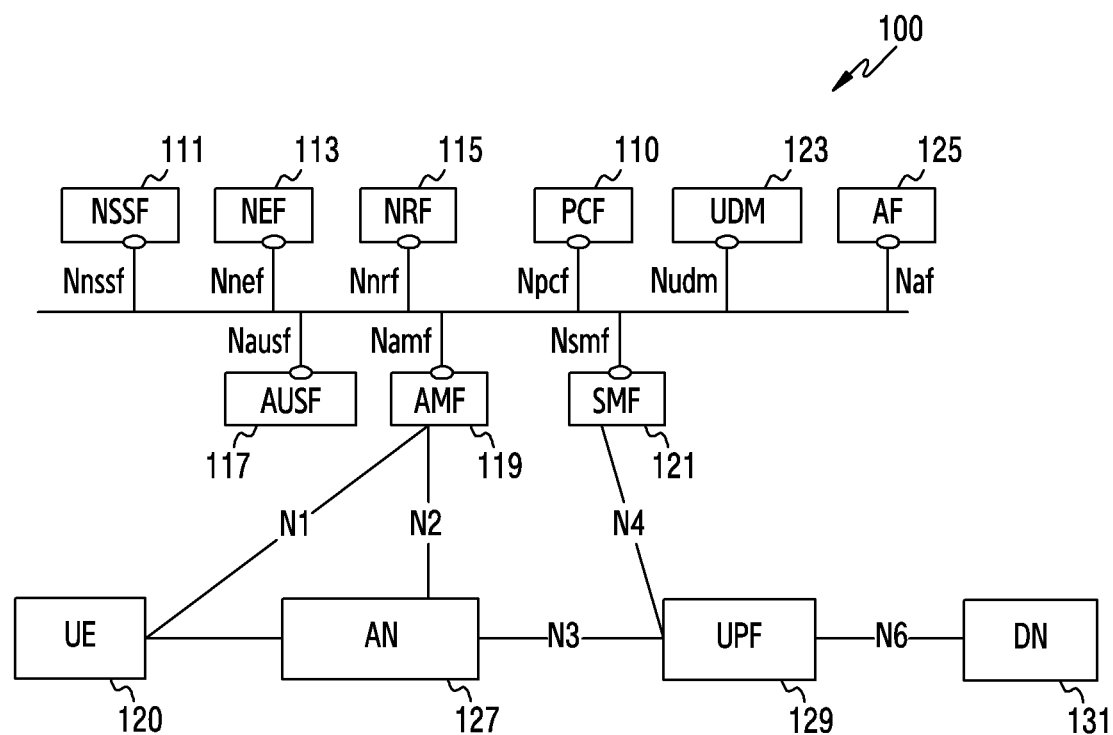
FIG. 1 illustrates a network structure and an interface in a wireless communication system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to a device and a method for policy management of a user equipment (UE) in a wireless communication system. Specifically, the disclosure provides a technology for transferring a UE policy and performing an operation related to the UE policy in a wireless communication system.

In the following description, a term indicating a signal, a term indicating a message, a term indicating control information, terms indicating network entities, terms indicating elements of a device, and the like are exemplified for convenience of explanation. Accordingly, the disclosure is not limited to the following terms and other terms having the same technical meaning may be used.

In addition, the disclosure includes terms used in some communication protocols (e.g. 3rd generation partnership project (3GPP)) to explain various embodiments, but the terms merely correspond to examples. Various embodiments of the disclosure may also be easily modified and then applied to other communication systems.

For the evolution from a $4^{th}$ generation (4G) long term evolution (LTE) system to a $5^{th}$ generation (5G) system, 3GPP proposes a new core network structure named a 5G core (5GC), and relevant standardization is proceeding.

The 5GC may support a distinguishable function below compared to an evolved packet core (EPC) that is a network core for 4G.

First, in the 5GC, a network slicing function is introduced. According to the requirements of 5G, the 5GC is required to support various types of UE types and services. For example, the 5GC is required to be able to support various use cases, such as ultra-wideband mobile communications (enhanced mobile broadband, eMBB), ultra-reliable low latency communications (URLLC), and massive machine type communications (mMTC). The UE types and/or services described above have different requirements with respect to a core network. For example, eMBB service requires a high data rate, a URLLC service requires high stability and low latency, and mMTC service requires power saving and low battery consumption. A network slicing technology has been proposed to satisfy various service requirements described above.

Network slicing implies a method for virtualizing a physical network to generate a plurality of logical networks. Each of the generated plurality of logical networks may be called a network slice instance (NSI). The NSIs may have different characteristics. Therefore, each of the NSIs may perform a network function (NF) suitable for the characteristic of the each of the NSIs, and the plurality of NSIs may perform proper network functions to satisfy various service requirements, respectively. For example, if an NSI is assigned to be suitable for a service characteristic required by each UE, various 5G services may be efficiently supported.

Second, the 5GC may easily support a network virtualization paradigm by separating a mobility management function and a session management function. In 4G LTE, every UEs have been required to exchange signaling with single core equipment called a mobility management entity (MME) configured to perform registration, authentication, mobility management, and session management functions in order to receive a service from a network. However, in 5G, there are a very large number of UEs required to be supported, and mobility and traffic/session characteristics required to be supported are segmented according to the types of the UEs. Therefore, in 5G, if single core equipment, such as an MME, supports all functions, limitations may be placed on scalability by which an entity can be added for each required function. Therefore, in order to reduce the functions and/or the implementation complexity of core equipment supporting a control plane, and improve scalability in terms of signaling loads, various functions based on a structure in which a mobility management function and a session management function are separated are being developed.

FIG. 1 illustrates a network structure and an interface in a wireless communication system 100 according to various embodiments of the disclosure.

Referring to FIG. 1, the wireless communication system 100 may include a policy control function (PCF) node 110, a network slice selection function (NSSF) node 111, a network exposure function (NEF) node 113, an NF repository function (NRF) node 115, an authentication server function (AUSF) node 117, an access and mobility management function (AMF) node 119, a UE 120, a session management function (SMF) node 121, a unified data management (UDM) node 123, an application function (AF) node 125, a radio access network (RAN) 127, a user plane function (UPF) node 129, and a data network (DN) 131.

The PCF node 110 may support a unified policy framework, provide policy rules through a control plane, and access subscription information in a user data repository (UDR) to determine a policy. The PCF node 110 may perform all or a part of the functions of a policy and charging rules function (PCRF) in an evolved packet core (EPC). The PCF node 110 may communicate with other nodes through an Npcf interface. In various embodiments, the PCF node 110 may be included in a UE policy server, or may correspond to the UE policy server.

The NSSF node 111 may select a node of the wireless communication system 100 and/or an NSI of a core network for supporting a service and/or a session required by the UE 120. The NSSF node 111 may communicate with other nodes through an Nnssf interface.

The NEF node 113 is a node for opening a network, and may support security of information provided from an external application to a 3GPP network (e.g. the wireless communication system 100, a 5G network), and may translate external information and/or internal information. The NEF node 113 may communicate with other nodes through an Nnef interface.

The NRF node 115 may manage NF profiles and available NF instances. The NRF node 115 may communicate with other nodes through an Nnrf interface.

The AUSF node 117 may operate as an authentication server. For example, the AUSF node 117 may perform all or a part of the functions of a home subscriber server (HSS) in an EPC. The AUSF node 117 may communicate with other nodes through an Nausf interface.

The AMF node 119 may terminate non-access stratum (NAS) signaling, and may perform NAS ciphering and/or integrity protection, registration management, connection management, mobility management, access authentication, and security context management. For example, the AMF node 119 may perform all or a part of the functions of an MME in an EPC. The AMF node 119 may communicate with other nodes through an Namf interface. In addition, the AMF node may communicate with the UE 120 through an N1 interface, and may be connected to the RAN 127 through an N2 interface.

The UE 120 is a device used by a user and communicates with a base station of the RAN 127 through wireless channels. In some cases, the UE 120 may be operated without involvement of a user. That is, the UE 120 is a device configured to perform machine-type communication (MTC) and may not be carried by a user. According to various embodiments of the disclosure, the UE 120 may be called "a terminal", "a mobile station", "a subscriber station", "a remote terminal", "a wireless terminal", "a user device", or other terms having a technical meaning equivalent thereto. The UE 120 may communicate with the AMF node 119 through the N1 interface.

The SMF node 121 may perform session management (e.g. session configuration, change, and release), Internet protocol (IP) address assignment and management for the UE, termination of NAS signaling related to session management, downlink data notification, and traffic steering for the UPF 129 for proper traffic routing. The SMF node 121 may communicate with other nodes through an Nsmf interface, and may communicate with the UPF 129 through an N4 interface.

The UDM node 123 may generate an authentication and key agreement credential, process user identity information, and perform access authentication and subscription management. The UDM node 123 may perform all or a part of the functions of an HSS in an EPC. The UDM node 123 may communicate with other nodes through an Nudm interface.

The AF node 125 may control traffic routing, and interact with a policy framework for policy control. The AF node 125 may perform all or a part of the functions of an AF in an EPC. The AF node 125 may communicate with other nodes through an Naf interface.

The RAN 127 may provide wireless access to the UE 120. The RAN 127 may provide wireless access to the UE 120 through a base station. The base station may have a coverage defined as a predetermined geographical area, based on a distance by which the base station can transmit a signal. The base station may be called "an access point (AP)", "an eNodeB (eNB)", "a 5th generation node", "a wireless point", "a transmission/reception point (TRP)" or other terms having a technical meaning equivalent thereto. According to various embodiments of the disclosure, the base station and the UE 120 may transmit and receive a wireless signal in millimeter wave (mmWave) bands (e.g. 28 GHz, 30 GHz, 38 GHz, and 60 GHz). To improve channel gain, the base station and the UE 120 may perform beamforming Beamforming may include transmission beamforming and reception beamforming. That is, the base station and the UE 120 may give directivity to a transmission signal or a reception signal. To this end, the base station and the UE 120 may select serving beams through a beam search procedure or a beam management procedure. Communication after the serving beams are selected may be performed through resources having a quasi-co-located (QCL) relationship with resources used for transmission of the serving beams. In various embodiments, the RAN 127 may include a base station, or may correspond to a base station. In the following description, the RAN 127 and the base station may be used interchangeably.

The UPF node 129 may perform packet routing and forwarding, packet inspection, and quality of service (QoS) management. The UPF node 129 may operate as an external protocol data unit (PDU) session point for interconnection with the data network 131. In addition, the UPF node 129 may operate as an anchor point for moving between different radio access technologies (RATs) or moving in the same RAT. The UPF node 129 may perform all or a part of the functions of a serving gateway (S-GW) and/or a packet data network gateway (P-GW) in an EPC. The UPF node 129 may be connected to the RAN 127 through an N3 interface, may be connected to the DN 131 through an N6 interface, and may communicate with the SMF 121 through the N4 interface.

Each of the nodes illustrated in FIG. 1 may be an independent hardware device, but may be a logical area or hardware area of a universal server device configured to perform the functions of each node by using virtualized resources. For example, at least two functions among the nodes illustrated in FIG. 1 may be performed by an identical server device.

Figure 2:
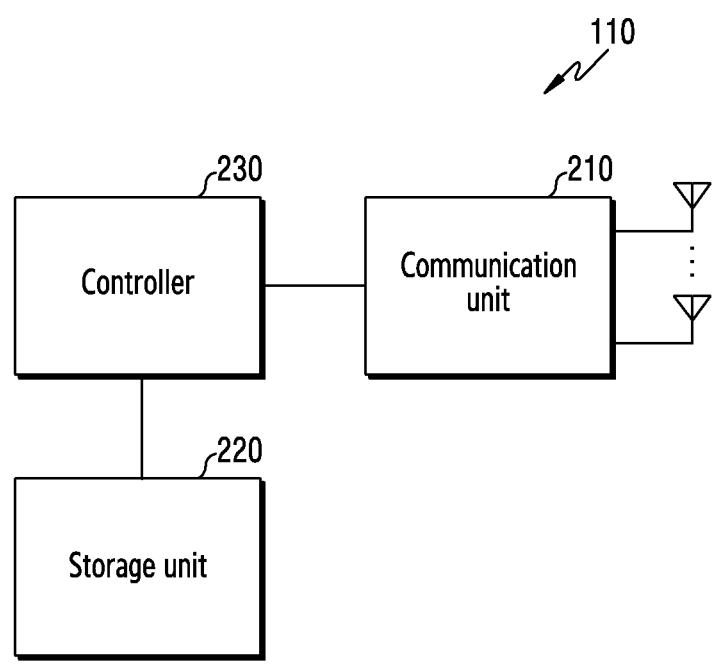
FIG. 2 illustrates a configuration of a policy control function (PCF) node in a wireless communication system according to various embodiments of the disclosure.

FIG. 2 illustrates a configuration of a PCF node in a wireless communication system according to various embodiments of the disclosure. The configuration illustrated in FIG. 2 may be understood as a configuration of the PCF node 110. The term ". . . unit" or the ending of a word, such as ". . . or", ". . . er", or the like used hereinafter may indicate a unit of processing at least one function or operation, and this may be embodied by hardware, software, or a combination of hardware and software.

Referring to FIG. 2, the PCF node 110 includes a communication unit 210, a storage unit 220, and a controller 230.

The communication unit 210 provides an interface for performing communication with other nodes within a network. That is, the communication unit 210 converts, into a physical signal, a bit stream transmitted from the PCF node 110 to another node, for example, at least one of the nodes of the wireless communication system 100, and converts a physical signal received from another node into a bit stream. In addition, the communication unit 210 may transmit and receive a signal. Accordingly, the communication unit 210 may be called a modem, a transmitter, a receiver, or a transceiver. The communication unit 210 may allow the PCF node to communicate with other devices or a system through backhaul connection (e.g. wired backhaul or wireless backhaul) or a network.

The storage unit 220 stores data such as a basic program, an application program, and configuration information for the operation of the PCF node. Specifically, the storage unit 220 may store at least one UE policy. The storage unit 220 provides stored data in response to a request of the controller 230.

The controller 230 controls overall operations of the PCF node. For example, the controller 230 transmits or receives a signal through the communication unit 210. In addition, the controller 230 records and reads data in and from the storage unit 220. To this end, the controller 230 may include at least one processor.

According to various embodiments, the controller 230 may transmit a UE policy, based on a pre-configured condition, and may control the communication unit 210 to transmit a message including the UE policy and receive information relating to a result of a PS operation performed based on the UE policy by the UE. For example, the controller 230 may control the PCF node to perform operations according to various embodiments described later.

According to various embodiments of the disclosure, the PCF node may be virtualized, and may be a universal server device configured to perform the functions of the PCF node by using virtualized resources, or a part of the universal server device (e.g. a logical area or hardware area of the universal server device). In this case, the elements illustrated in FIG. 2 may be understood as elements of a server device. In addition, if the PCF node is virtualized, the communication unit 210 may provide an interface for communicating with virtual NF nodes, the storage unit 220 may be a virtual storage or a part thereof, and the controller 230 may be a virtual processor or a part thereof.

Figure 3:
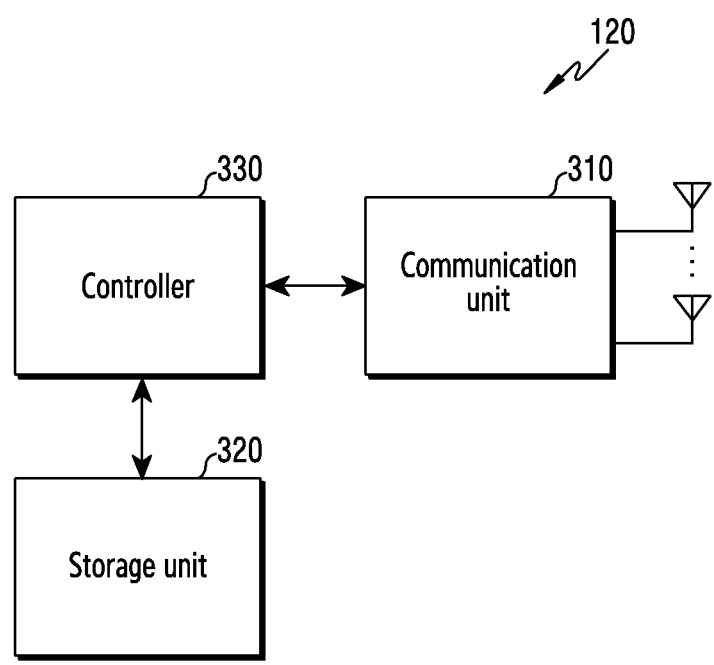
FIG. 3 illustrates a configuration of a user equipment (UE) in a wireless communication system according to various embodiments of the disclosure.

FIG. 3 illustrates a configuration of a UE in a wireless communication system according to various embodiments of the disclosure. The configuration illustrated in FIG. 3 may be understood as a configuration of the UE 120. The term ". . . unit" or the ending of a word, such as ". . . or", ". . . er", or the like used hereinafter may indicate a unit of processing at least one function or operation, and this may be embodied by hardware, software, or a combination of hardware and software.

Referring to FIG. 3, the UE includes a communication unit 310, a storage unit 320, and a controller 330.

The communication unit 310 performs functions for transmitting or receiving a signal through a wireless channel For example, the communication unit 310 performs a function of conversion between a baseband signal and a bit stream according to a physical layer protocol of the system. For example, when data is transmitted, the communication unit 310 generates complex symbols by encoding and modulating a transmission bit stream. In addition, when data is received, the communication unit 310 reconstructs a reception bit stream by demodulating and decoding a baseband signal. Furthermore, the communication unit 310 up-converts a baseband signal into a radio frequency (RF) band signal and then transmits the converted RF band signal through an antenna, and down-converts an RF band signal received through an antenna into a baseband signal. For example, the communication unit 310 may include a transmission filter, a reception filter, an amplifier, a mixer, an oscillator, a DAC, an ADC, and the like.

In addition, the communication unit 310 may include a plurality of transmission/reception paths. Furthermore, the communication unit 310 may include at least one antenna array including a plurality of antenna elements. In view of hardware, the communication unit 310 may be configured as a digital circuit and an analog circuit (e.g. radio frequency integrated circuit (RFIC)). The digital circuit and the analog circuit may be implemented as a single package. Furthermore, the communication unit 310 may include a plurality of RF chains. Moreover, the communication unit 310 may perform beamforming.

The communication unit 310 transmits and receives a signal as described above. Accordingly, the entirety or a part of the communication unit 310 may be called "a transmitter", "a receiver", or "a transceiver". In addition, in the following description, transmission and reception through a wireless channel may be understood to include the processing performed by the communication unit 310, as described above.

The storage unit 320 stores data such as a basic program, an application program, and configuration information for the operation of the UE. The storage unit 320 may be configured as a volatile memory, a non-volatile memory, or a combination of a volatile memory and a non-volatile memory. The storage unit 320 provides stored data in response to a request of the controller 330.

The controller 330 controls overall operations of the UE. For example, the controller 330 transmits and receives a signal through the communication unit 310. In addition, the controller 330 records and reads data in and from the storage unit 320. In addition, the controller 330 may perform functions of a protocol stack required in a communication protocol. To this end, the controller 330 may include at least one processor or microprocessor, or may be a part of a processor. Furthermore, the controller 330 and a part of the communication unit 310 may be called a communication processor (CP).

According to various embodiments, the controller 330 may control the communication unit 310 to receive a message including a UE policy, and may perform a PS operation relating to at least one PS in which the UE policy is included. In addition, the controller 330 may control the communication unit 310 to transmit information relating to a result of the PS operation. For example, the controller 330 may control the UE to perform operations according to various embodiments described later.

Hereinafter, a technology for transferring a UE policy and performing an operation related to the UE policy in a wireless communication system will be described.

A UE policy may include an access network discovery & selection policy (ANDSP) and a UE route selection policy (URSP). The ANDSP may include a policy for selecting, by the UE, a non-3GPP access network (e.g. a wireless local area network (WLAN) such as a wireless fidelity (Wi-Fi) network) rather than a 3GPP access network, for example, the RAN 127.

The URSP may be used to determine whether to associate application traffic detected by the UE, with a pre-generated PDU session, whether to offload application traffic detected by the UE to a non-3GPP access network other than a PDU session, or whether to request generation of a new PDU session. The URSP may include a service and session continuity mode selection policy, a network slice selection policy, a data network name (DNN) selection policy, a non-seamless offloading policy, and an access type preference indicating whether a 3GPP access network or a non-3GPP access network is preferred.

A UE policy may be pre-configured for the UE, or may be configured by the PCF node.

The PCF node may distribute a UE policy while an initial registration procedure is performed, or when an AMF node managing the mobility of the UE or the location change of the UE is changed. As another example, the PCF node may distribute a UE policy at a time designated by an operator. A UE policy may be divided into policy sections by the PCF node, and after the division by the PCF node, the policy sections may be transferred to the UE.

Hereinafter, the ANDSP will be described.

The UE may perform registration through a non-3GPP interworking function (N3IWK) in a 5GC, and then use a WLAN.

If a WLAN is unable to be selected due to a user preference, the UE may determine the most preferred WLAN by using a WLAN selection policy (WLANSP).

The ANDSP may include at least one WLANSP rule, and the WLANSP may include a condition making the policy valid, and a WLAN selection criterion. The condition making the WLANSP policy valid may include information relating to a time or spatial region at which the WLANSP is valid, an operator, and network location information such as a location area. In addition, the WLAN selection criterion may include information such as a preferred roaming partner list, and a minimum backhaul threshold.

Hereinafter, a URSP rule will be described.

The URSP includes URSP rules having priorities. The URSP may be provided to the UE by a home operator.

A URSP rule may include the contents as shown in Table 1 below.

TABLE 1

| Information name | Description |
| --- | --- |
| Rule Precedence | The priority by which the URSP rule is enforced in the UE |
| Overriding user preference indication | An indicator indicating whether the URSP rule is capable of ignoring a user preference configuration |
| Forcible enforcement indication | An indicator indicating that rules newly added to the UE, replaced, or removed are required to be immediately enforced even in spite of occurrence of service disconnection |
| Traffic descriptor | A traffic descriptor for a UE policy |
| Application identifier | An application identifier |
| IP descriptor | The IP descriptor indicates three pieces of IP information (IP 3 tuple), that is, indicates a destination IPv4 address or an IPv6 network prefix, a destination port address, and an IP higher protocol identifier (ID) |
| Non-IP descriptor | A descriptor for non-IP traffic |
| Route selection descriptor list | The list is described in detail in Table 2 |

Referring to Table 1, a URSP rule may include a rule precedence, a traffic descriptor, and a list of route selection descriptors. The traffic descriptor may include an application identifier, an IP descriptor, and a non-IP descriptor.

The list of route selection descriptors may include the contents as shown in Table 2 below.

TABLE 2

| Information name | Description |
| --- | --- |
| Route selection descriptor precedence | The priority by which the route selection descriptor is applied |
| Route selection component | The route selection component includes at least one of a session and service continuity (SSC) mode selection component, a network slice selection component, a DNN selection component, a non-seamless offloading selection component, and an access type preference selection component |
| SSC mode selection | The SSC mode selection includes at least one SSC mode value |
| Network slice selection | The network slice selection includes at least one single network slice selection assistance information (S-NSSAI) value |
| DNN selection | The DNN selection includes at least one DNN value |
| Non-seamless offloading indicator | The indicator is used to determine whether the UE applies non-seamless offloading to an application matching the rule |
| Access type preference indicator | The indicator indicates an access type (e.g. a 3GPP access network or a non-3GPP access network) preferred when the UE generates a PDU session with respect to the traffic of an application matching the rule |

Referring to Table 2, the route selection descriptors may include route selection components, and the route selection components may include an SSC mode selection, a network slice selection, a non-seamless offloading indicator, and an access type preference indicator.

According to various embodiments of the disclosure, a URSP rule may further include an overriding user preference indication. The overriding user preference indication may indicate an additional preference with respect to the URSP rule of the UE in addition to a rule precedence. For example, the overriding user preference indication may indicate disregard of a preference configuration (or an environment configuration) of a user, and enforcement of a URSP policy designated by an operator. A USRP rule including the overriding user preference indication may precede all other URSP rules (e.g. a URSP rule provided by an operator, a pre-configured URSP rule, a policy generated by an internal policy of the UE, or a URSP rule configured according to a user preference), and may have a higher priority than all the other URSP rules. The overriding user preference indication is unable to be applied to a match-all filter. If the overriding user preference indication is not included in a URSP rule, the URSP rule is unable to ignore a user preference. The overriding user preference indication may be transferred to the UE together with the rule precedence of the URSP rule, as shown in Table 1. If a URSP rule does not include the overriding user preference indication, the UE may not ignore a user preference configuration, and may perform an operation corresponding to the user preference configuration. According to an embodiment, the overriding user preference indication may be necessarily included in a URSP rule, and may indicate whether to ignore a user preference configuration (e.g. if the value of the overriding user preference indication is 1, the user preference configuration is ignored, and if the value is 0, same is not ignored). As another example, the overriding user preference indication may be expressed by a particular bit in information (e.g. the rule precedence in Table 1) indicating the priority of a URSP rule in the rule, and may indicate whether to ignore a user preference configuration (e.g. if the value of the overriding user preference indication is 1, the user preference configuration is ignored, and if the value is 0, same is not ignored) via the particular bit.

According to various embodiments of the disclosure, a URSP rule may include a forcible activation indication. The forcible activation indication may be called a forcible enforcement indication. The forcible activation indication may indicate that rules newly added to the UE, replaced, or removed are required to be immediately enforced even if a service gets disconnected. If the forcible activation indication is not included in a URSP rule, the UE is required to enforce rules newly added, replaced, or removed, based on a method that does not incur service disconnection. The method that does not incur service disconnection may include a method that does not cut off a network connection of an application designated in a rule to be replaced or removed from the UE, in order to cut off a connection of a PDU session associated with the existing rule.

The forcible enforcement indication may be transferred to the UE together with a URSP rule as shown in Table 1, and may indicate whether each URSP rule is required to be forcibly enforced. According to an embodiment, the forcible enforcement indication may be included in a UE policy section, and may indicate whether all rules included in the UE policy section are forcibly enforced. As another example, the forcible enforcement indication may be included in a UE policy container, and may indicate whether all rules included in the UE policy container are forcibly enforced. As another example, the forcible enforcement indication may be transferred to the UE together with a last transaction indicator, and may indicate whether all UE policies transferred through the last transaction and all the previous transactions are forcibly enforced.

According to various embodiments of the disclosure, a non-seamless offloading indicator indicates whether offloading of application traffic to a non-3GPP access network other than a PDU session is allowed, and/or whether same is preferred. An available value of the non-seamless offloading indicator and an operation of the UE according to the value of the non-seamless offloading indicator are described as below.

1) Allowed but not preferred: the value of the non-seamless offloading indicator may be "allowed but not preferred". If a PDU session matching a URSP rule is available, and a non-3GPP access other than the PDU session is available, the UE is required to select the PDU session matching the URSP rule. If a PDU session matching a PDU session is not available, and a non-3GPP access other than the PDU session is available, detected application traffic is allowed to be offloaded to the non-3GPP access other than the PDU session.
2) Allowed and preferred: the value of the non-seamless offloading indicator may be "allowed and preferred". If a PDU session matching a URSP rule is available, and a non-3GPP access other than the PDU session is available together, the UE is required to select the non-3GPP access other than the PDU session.
3) Not allowed (prohibited or not allowed): the value of the non-seamless offloading indicator may be "not allowed". Detected application traffic is not allowed to select a non-3GPP access other than a PDU session.
4) Only allowed to use offloading—not allowed to use any PDU session: the value of the non-seamless offloading indicator may be "only allowed to use offloading—not allowed to use any PDU session". Detected application traffic is required to select a non-3GPP access other than a PDU session. If a non-3GPP access is not available, application traffic is not transferred.

If a route selection descriptor includes the non-seamless offloading indicator, and the value of the non-seamless offloading indicator corresponds to "only allowed to use offloading", other components are incapable of being included in the route selection descriptor. Otherwise, that is, if the non-seamless offloading indicator is not included in a route selection descriptor, or if the value of the non-seamless offloading indicator is not "only allowed to use offloading" although the non-seamless offloading indicator is included in the route selection descriptor, other components may be included in the route selection descriptor. If the non-seamless offloading indicator is not included in a route selection descriptor, the UE may consider that the value of the non-seamless offloading indicator is "allowed but not preferred". If a DNN configured for the UE is configured to be a local area data network (LADN), the value of the non-seamless offloading indicator may be configured to be "prohibited or not allowed".

The PCF node transferring a UE policy may divide the UE policy into at least one policy section. The at least one policy section may include a plurality of different policy sections, and each of the policy sections may be distinguished by a policy section identifier (PSI). The PCF node may assign all URSP rules to one policy section, or may assign one or multiple URSP rules to one policy section. The PCF node may compare a PSI list received from the UE with a list of PSIs to be installed in the UE, to determine whether to transfer the UE policy to the UE, and/or whether to update the UE policy. If the PCF node determines to update the UE policy, the PCF node may transfer, to the UE, a list of PSIs to be updated or transferred, and contents relating to each of the PSIs.

The UE may transfer a PSI list stored in the UE during a registration procedure (e.g. an initial registration procedure) to the PCF node. If there is no UE policy stored in the UE, the UE may not transfer the PSI list to the PCF node. The UE may transfer UE policy information to synchronize a UE policy in an initial registration procedure. The operation of transferring UE policy information may be performed if there is no UE policy stored in the UE when the UE is powered on, or if a universal subscriber identity module (USIM) is moved from the UE to another UE.

The UE may update a UE policy stored in the UE or a UE policy, based on a UE policy provided from the PCF node.

If a UE policy relating to a PSI identical to a PSI transferred from the PCF node is not stored in the UE, the UE may store UE policy rules included in a policy section indicated by the new PSI. If a UE policy relating to a PSI identical to a PSI transferred from the PCF node is stored in the UE, the UE may update (or replace) the stored UE policy to a UE policy included in a policy section indicated by the received PSI. If contents are not included in a policy section indicated by a PSI transferred from the PCF node, the UE may remove a policy section relating to a stored PSI. In other words, the UE may remove the policy section relating to the PSI transferred from the PCF node.

Hereinafter, with reference to FIGS. 4 and 5, an operation of the PCF node for transferring a UE policy, and an operation of the UE for enforcing the received UE policy will be described.

Figure 4:
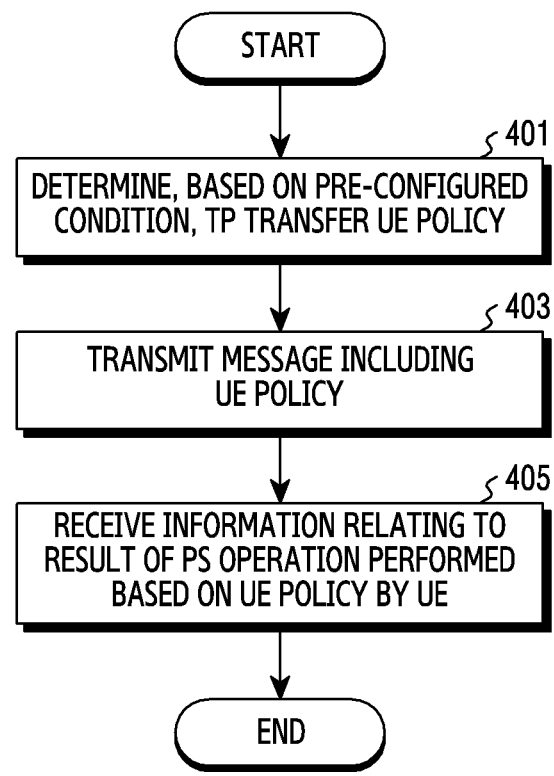
FIG. 4 illustrates a flowchart of a PCF node in a wireless communication system according to various embodiments of the disclosure.

FIG. 4 illustrates a flowchart of a PCF node in a wireless communication system according to various embodiments of the disclosure. FIG. 4 illustrates an example of an operating method of the PCF node 110.

Referring to FIG. 4, in operation 401, a PCF node may determine, based on a pre-configured condition, to transfer a UE policy. The pre-configured condition may include at least one of whether a registration procedure for a UE has been performed successfully, or whether addition, change, or removal of a UE policy is required. The UE policy may be included in at least one PS. Each of the at least one PS may correspond to a PSI, and may include at least one of an ANDSP rule and a URSP rule. A URSP rule may include at least one of an overriding user preference indication, a forcible enforcement indication, and a non-seamless offloading indicator.

In operation 403, the PCF node transmits a message including the UE policy. The UE policy may be included in a UE policy container of the message. In addition, the message may include an indicator indicating whether a transaction in which the message is transmitted is the last transaction for transferring the UE policy. The message may include a policy operation indicating addition, change, or removal of a rule. A policy operation may include information indicating a target PSI subjected to the policy operation and the contents (e.g. addition, removal, or change) of the policy operation. The message may include at least one of a temporal condition and a spatial condition for enforcement of the UE policy.

In operation 405, the PCF node may receive information relating to a result of a PS operation performed based on the UE policy by the UE. A PS operation may include an operation of adding, changing, or removing, by the UE, a rule of a policy section corresponding to at least one PSI according to the policy operation included in the message. In addition, a PS operation may include an operation of enforcing a rule. The information relating to the result of the PS operation may include at least one of: a list of PSIs corresponding to added, changed, or removed policy rules; and in a case where a policy rule is not enforced, the cause of the non-enforcement and a PSI corresponding to the policy rule.

Figure 5:
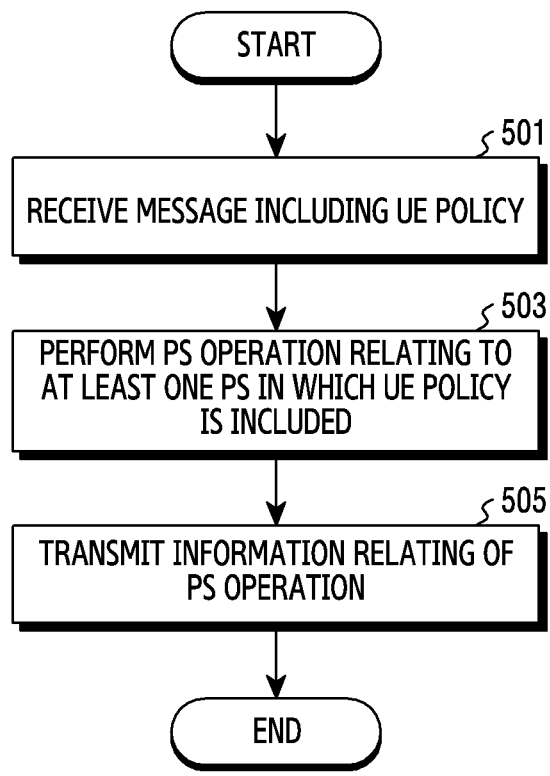
FIG. 5 illustrates a flowchart of a UE in a wireless communication system according to various embodiments of the disclosure.

FIG. 5 illustrates a flowchart of a UE in a wireless communication system according to various embodiments of the disclosure. FIG. 5 illustrates an example of an operating of the UE 120.

Referring to FIG. 5, in operation 501, a UE receives a message including a UE policy. The UE policy may be included in a UE policy container of the message. In addition, the UE policy may be included in at least one PS. Each of the at least one PS may correspond to a PSI, and may include at least one of an ANDSP rule and a URSP rule. A URSP rule may include at least one of an overriding user preference indication, a forcible enforcement indication, and a non-seamless offloading indicator. The message may include an indicator indicating whether a transaction in which the message is transmitted is the last transaction for transferring the UE policy. The message may include a policy operation indicating addition, change, or removal of a rule. A policy operation may include information indicating a target PSI subjected to the policy operation and the contents (e.g. addition, removal, or change) of the policy operation. The message may include at least one of a temporal condition and a spatial condition for enforcement of the UE policy.

In operation 503, the UE performs a PS operation relating to at least one PS in which the UE policy is included. A PS operation may include an operation of adding, changing, or removing, by the UE, a rule of a policy section corresponding to at least one PSI according to the policy operation included in the message. In addition, a PS operation may include an operation of enforcing a rule.

In operation 505, the UE transmits information relating to a result of the PS operation. The information relating to the result of the PS operation may include at least one of: a list of PSIs corresponding to added, changed, or removed policy rules; and in a case where a policy rule is not enforced, the cause of the non-enforcement and a PSI corresponding to the policy rule.

Figure 6:
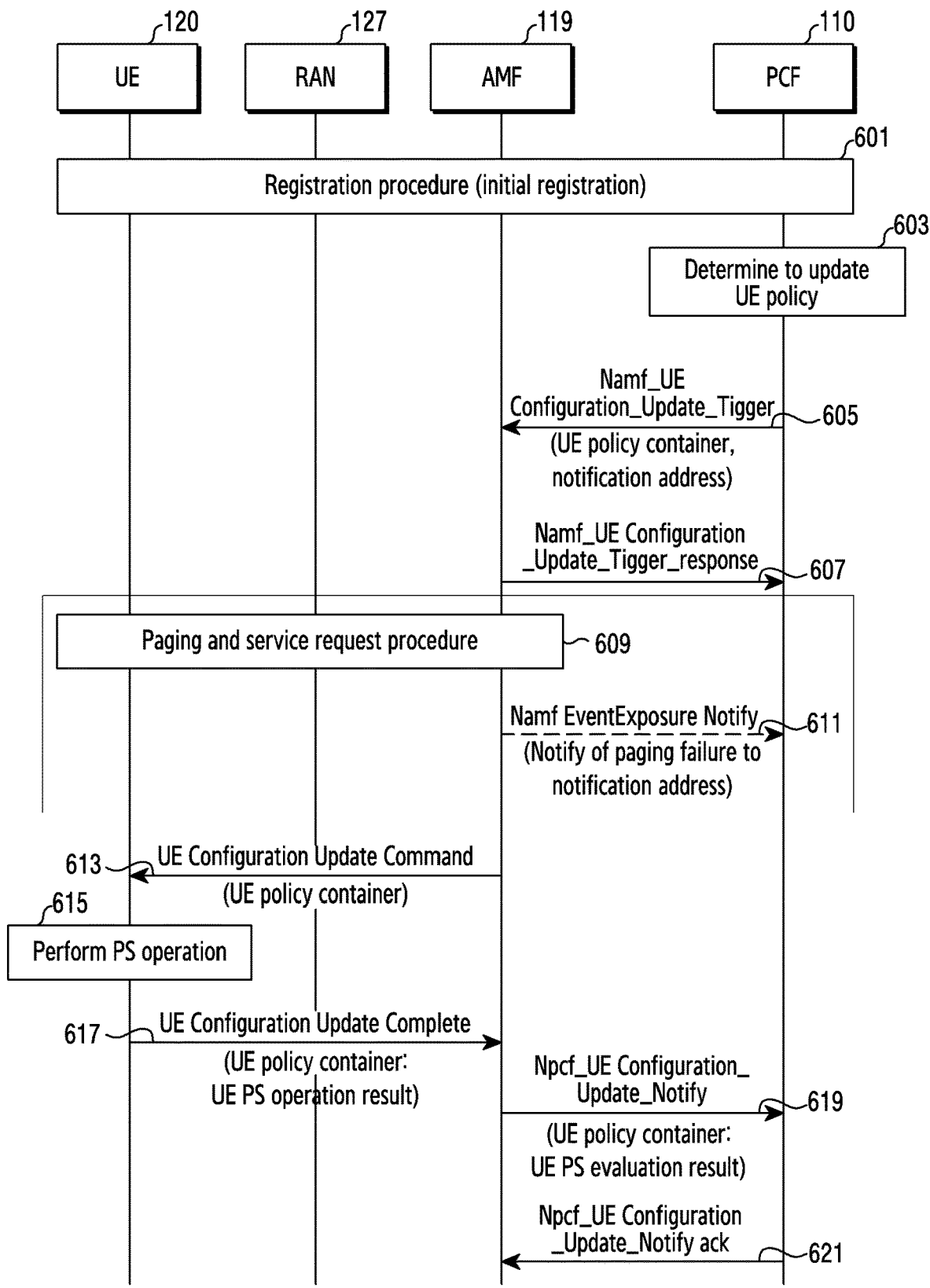
FIG. 6 illustrates a signal flow diagram of a procedure of transferring a UE policy by using a UE configuration update service in a wireless communication system according to various embodiments of the disclosure.

FIG. 6 illustrates a signal flow diagram of a procedure of transferring a UE policy by using a UE configuration update service in a wireless communication system according to various embodiments of the disclosure. FIG. 6 illustrates a signal flow between the PCF node 110, the AMF node 119, and the AMF 120.

Referring to FIG. 6, in operation 601, a registration procedure between the PCF node 110 and the UE 120 is performed. The registration procedure performed in operation 601 may be a registration procedure for initial registration.

In operation 603, the PCF node 110 determines to transfer a UE policy. In other words, the PCF node 110 determines to update a UE policy. The PCF node 110 may determine, based on a pre-configured condition, to transfer a UE policy. For example, if a registration procedure or an initial registration procedure has been performed successfully, the PCF node 110 may determine to transfer a UE policy. As another example, if addition, modification, and/or removal of a policy section in a UE policy is required, the PCF node 110 may determine to transfer a UE policy.

In operation 605, the PCF node 110 may transfer a UE configuration update trigger message to the AMF node 119. If the PCF node 110 determines to update a UE policy, the PCF node 110 may call an Namf_UEConfiguration_Update_Trigger service provided by the AMF node 119. The UE configuration update trigger message may include at least one of a UE identifier (e.g. a subscription permanent identifier (SUPI) or a generic public subscription identifier (GPSI)), a UE policy container, and a notification address. The UE policy container may include at least one of a UE policy section ID, the contents of a UE policy section, and an operation relating to a UE policy.

In operation 607, the AMF node 119 may transfer a UE configuration update trigger response message to the PCF node 110. In other words, the AMF node 119 may transfer an Namf_UEConfigiration_Update_Trigger_Response message to the PCF node 110 in response to the Namf_UEConfiguration_Update_Trigger message in operation 605.

In operation 609, if the UE is in a connection management idle (CM-IDLE) state, a paging and/or service request procedure between the UE 120 and the AMF node 110 is performed. If the UE is in a CM-IDLE state and is reachable, the AMF node 119 transmits a paging message including a paging request to the UE 120. The UE 120 having received the paging request performs a service request procedure (a UE triggered service request procedure) triggered by the UE. If a paging procedure is successfully performed, the UE 120 may change to a CM-CONNECTED state.

In operation 611, the AMF node 119 transmits a message for event exposure notification to the PCF node 110. In other words, the AMF node 119 transmits an Namf_EventExposure_Notify message to the PCF node 110. If paging fails, the AMF node 119 notifies of a paging failure of the UE to a notification address of the PCF node 110. In other words, if the UE is unreachable, the AMF node 119 may report, to the PCF node 110, a delivery report failure message indicating that the UE policy container is unable to be transferred to the UE.

In operation 613, the AMF node 119 may transmit a UE configuration update command message to the UE 120. In other words, the AMF node 119 transfers a UEConfiguration_Update_Command message to the UE 120. If the UE is in a CM-CONNECTED state, the AMF node 119 transmits the UE policy container received from the PCF node 110, through the UEConfiguration_Update_Command message to the UE 120. The UE policy container may include information related to selection of UE access and/or a PDU session. In addition, the UE policy container may include a list of PSIs to be added to the UE, or replaced, changed, or removed from the UE. In addition, the UE policy container may include a UE policy operation to be performed by the UE with respect to each PSI. A UE policy operation may include an operation of adding, replacing, changing, or removing a UE policy. A UE policy operation may include forcible enforcement or immediate activation of a PSI.

In operation 615, the UE 120 performs an operation relating to a policy section (PS). In other words, the UE 120 performs a PS operation. The UE 120 receives the UE policy container, and the UE 120 identifies a UE policy operation (i.e. addition, replacement, change, and/or removal of a UE policy) relating to a policy section of a PSI. If the UE 120 determines to add or replace a policy section of a PSI, the UE 120 authenticates the contents of the policy section. For example, the UE 120 may authenticate an encoding format of the contents of the policy section, and may inspect whether the contents of the policy section collide with an existing rule and/or a user preference. If authentication of the contents of the policy section is completed, the UE 120 determines whether to adopt the operation relating to the policy section. If execution of the operation relating to the policy section, performed by the UE 120 is refused or fails, the UE 120 may report the cause of the failure to the PCF node 110.

In operation 617, the UE 120 may transfer a UE configuration update complete message to the AMF node 119. In other words, the UE 120 transfers a UEConfiguration_Update_Complete message to the AMF node 119. The UEConfiguration_Update_Complete message may include a UE policy container. The UE policy container may include a result of execution of the PS operation, a failure cause of the case where the PS operation fails, and information relating to an additional warning of the case where the additional warning occurs although the PS operation is successful. The UE policy container may include a list of PSIs successfully added or replaced.

In operation 619, the AMF node 119 transfers a UE configuration update notify message to the PCF node 110. In other words, the AMF node 119 transfers an Npcf_UEConfiguration_Update_Notify message to the PCF node 110. The AMF node 119 having received a UEConfiguration_Update_Complete message from the UE 120 through the RAN 127 transfers a UE policy container including a result of a PS operation performed by the UE 120 through calling of an Npcf_UEConfiguration_Update_Notify service, through the Npcf_UEConfiguration_Update_Notify message to the PCF node 110.

In operation 621, the PCF node 110 transfers a UE configuration update notify acknowledgement message to the AMF node 119. In other words, the PCF node 110 transfers an Npcf_UEConfiguration_Update_Notify _ack message to the AMF node 119 in response to the Npcf_UEConfiguration_Update_Notify message.

Figure 7:
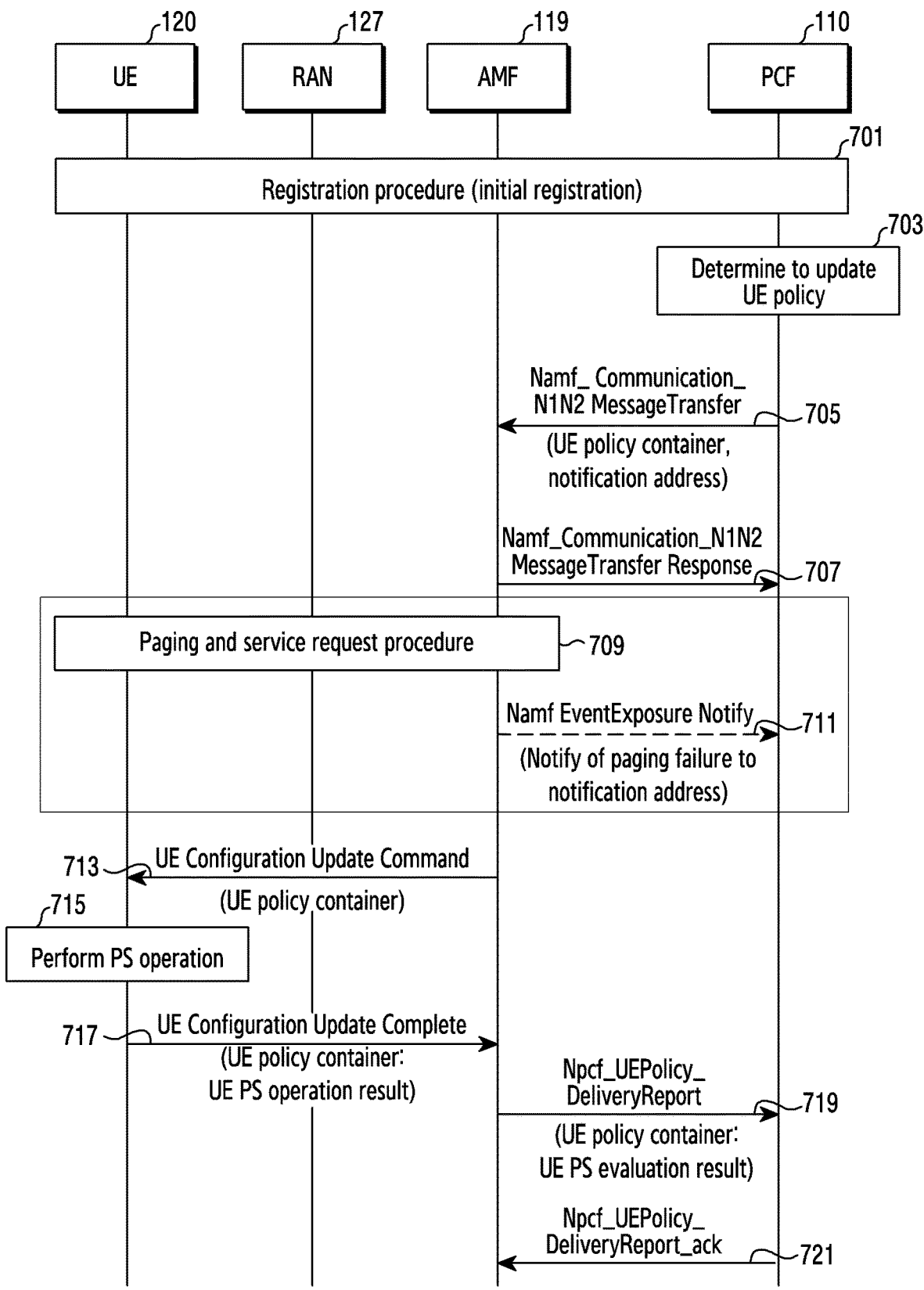
FIG. 7 illustrates a signal flow of a procedure of transferring a UE policy by using a message transmission service of an access and mobility management function (AMF) in a wireless communication system according to various embodiments of the disclosure.

FIG. 7 illustrates a signal flow of a procedure of transferring a UE policy by using a message transmission service of an AMF in a wireless communication system according to various embodiments of the disclosure. FIG. 7 illustrates a signal flow between the PCF node 110, the AMF node 119, and the AMF 120. The operations performed in operations 701, 703, 709, 711, 713, 715, and 717 in FIG. 7 are the same as the operations performed in operations 601, 603, 609, 611, 613, 615, and 617 in FIG. 6, respectively.

Referring to FIG. 7, in operation 705, the PCF node 110 transfers a communication N1N2 message transfer message to the AMF node 119. If the PCF node 110 determines to update a UE policy, the PCF node 110 may call an Namf_communication_N1N2MessageTransfer service provided by the AMF node 119 to transfer an Namf_communication_N1N2MessageTransfer message for requesting transfer of a UE policy container to the UE, to the AMF node 199. The Namf_communication_N1N2MessageTransfer message may include at least one of a UE identifier (e.g. an SUPI or a GPSI), a UE policy container, and a notification address. The UE policy container may include at least one of a UE policy section ID, the contents of a UE policy section, and an operation relating to a UE policy.

In operation 707, the AMF node 119 transfers a communication N1N2message transfer response message to the PCF node 110. In other words, the AMF node 119 may transfer an Namf_communication_N1N2MessageTransfer_Response message to the PCF node 110 in response to the Namf_communication_N1N2MessageTransfer message in operation 705.

In operation 719, the AMF node 119 transfers a UE policy delivery report message to the PCF node 110. In other words, the AMF node 119 transfers an Npcf_UEPolicy_DeliveryReport message to the PCF node 110. The AMF node 119 having received a UEConfiguration_Update_Complete message from the UE 120 through the RAN 127 transfers a UE policy container including a result of a PS operation performed by the UE 120 through calling of an Npcf_UEPolicy_DeliveryReport service, through the Npcf_UEPolicy_DeliveryReport message to the PCF node 110.

In operation 721, the PCF node 110 transfers a UE policy delivery report acknowledgement message to the AMF node 119. In other words, the PCF node 110 transfers an Npcf_UEPolicy_DeliveryReport_ack message to the AMF node 119 in response to the Npcf_UEPolicy_DeliveryReport message.

Figure 8:
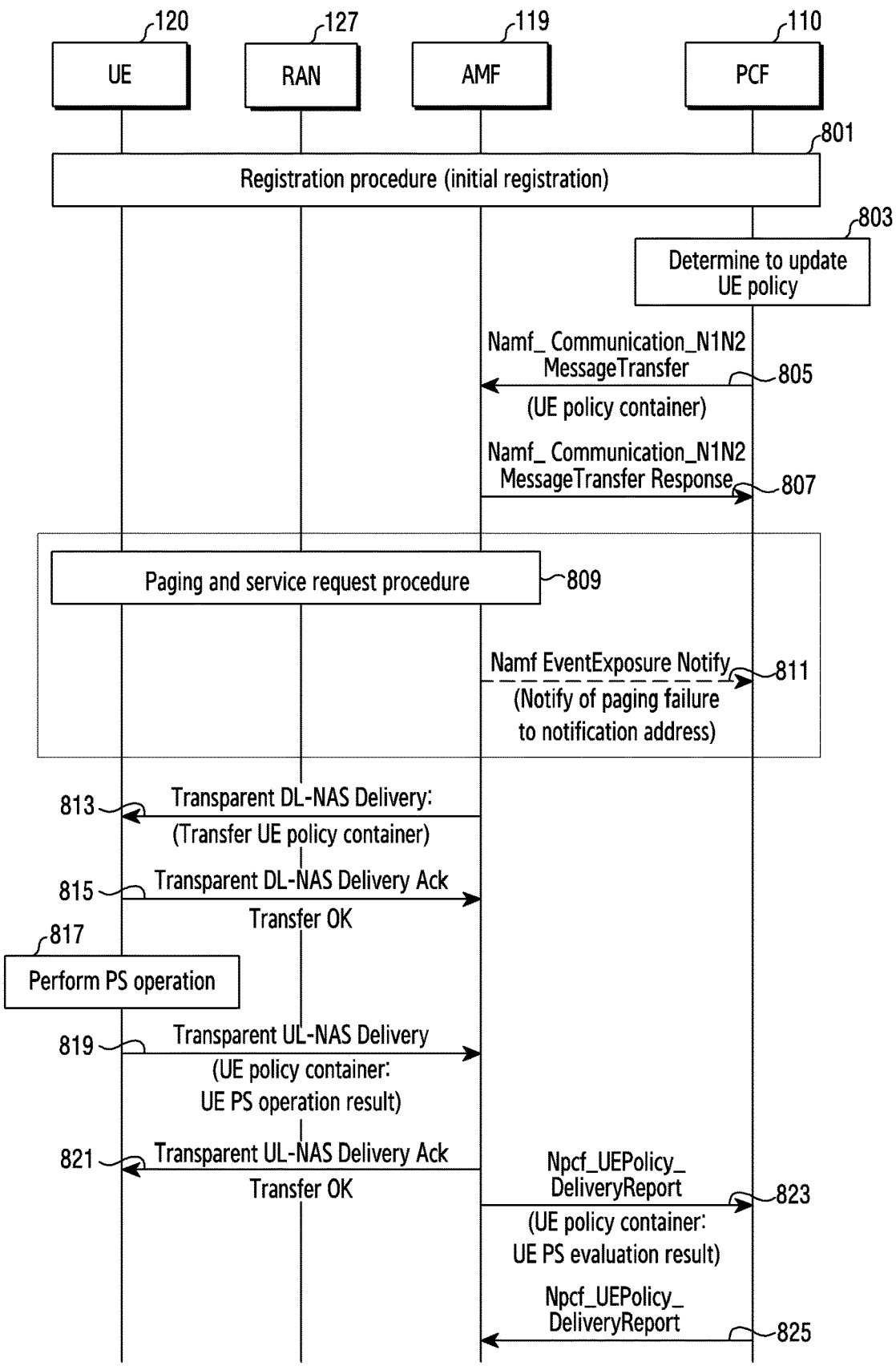
FIG. 8 illustrates a signal flow diagram of a procedure of transferring a UE policy by using downlink (DL) and/or uplink (UL) non-access stratum (NAS) transport in a wireless communication system according to various embodiments of the disclosure.

FIG. 8 illustrates a signal flow diagram of a procedure of transferring a UE policy by using downlink (DL) and/or uplink (UL) non-access stratum (NAS) transport in a wireless communication system according to various embodiments of the disclosure. FIG. 8 illustrates a signal flow between the PCF node 110, the AMF node 119, and the AMF 120. The operations performed in operations 801, 803, 805, 807, 809, 811, 817, 823, and 825 in FIG. 8 are the same as the operations performed in operations 701, 705, 707, 709, 711, 715, 719, and 721, respectively.

Referring to FIG. 8, in operation 813, the AMF node 119 transmits a transparent DL-NAS delivery message to the UE 120. In other words, the AMF node 119 transfers a Transparent_DL-NASDelivery message to the UE 120. If the UE is in a CM-CONNECTED state, the AMF node 119 transmits a UE policy container received from the PCF node 110, through the Transparent_DL-NASDelivery message to the UE 120. The UE policy container may include information related to selection of UE access and/or a PDU session. In addition, the UE policy container may include a list of PSIs to be added to the UE, or replaced, changed, or removed from the UE. In addition, the UE policy container may include a UE policy operation to be performed by the UE with respect to each PSI. A UE policy operation may include an operation of adding, replacing, changing, or removing a UE policy. A UE policy operation may include forcible enforcement or of a PSI.

In operation 815, the UE 120 transmits a transparent DL-NAS delivery acknowledgment message to the AMF node 119. In other words, the UE 120 transfers a Transparent_DL-NASDelivery_ack message to the AMF node 119. The UE 120 may transmit the Transparent_DL-NASDelivery_ack message to the AMF node 119 in response to the Transparent_DL-NASDelivery message received in operation 813.

In operation 819, the UE 120 transfers a transparent UL-NAS delivery message to the AMF node 119. In other words, the UE 120 transfers a Transparent UL-NASDelivery message to the AMF node 119. The Transparent_UL-NASDelivery message may include a UE policy container. The UE policy container may include a result of execution of a PS operation, a failure cause of the case where the PS operation fails, and information relating to an additional warning of the case where the additional warning occurs although the PS operation is successful. The UE policy container may include a list of PSIs successfully added or replaced.

In operation 821, the AMF node 119 transmits a transparent UL-NAS delivery acknowledgment message to the UE 120. In other words, the AMF node 119 transmits a Transparent_UL-NASDelivery_ack message to the UE 120. The AMF node 119 may transmit the Transparent_UL-NASDelivery_ack message to the UE 120 in response to the Transparent_UL-NASDelivery message received in operation 819.

Figure 9:
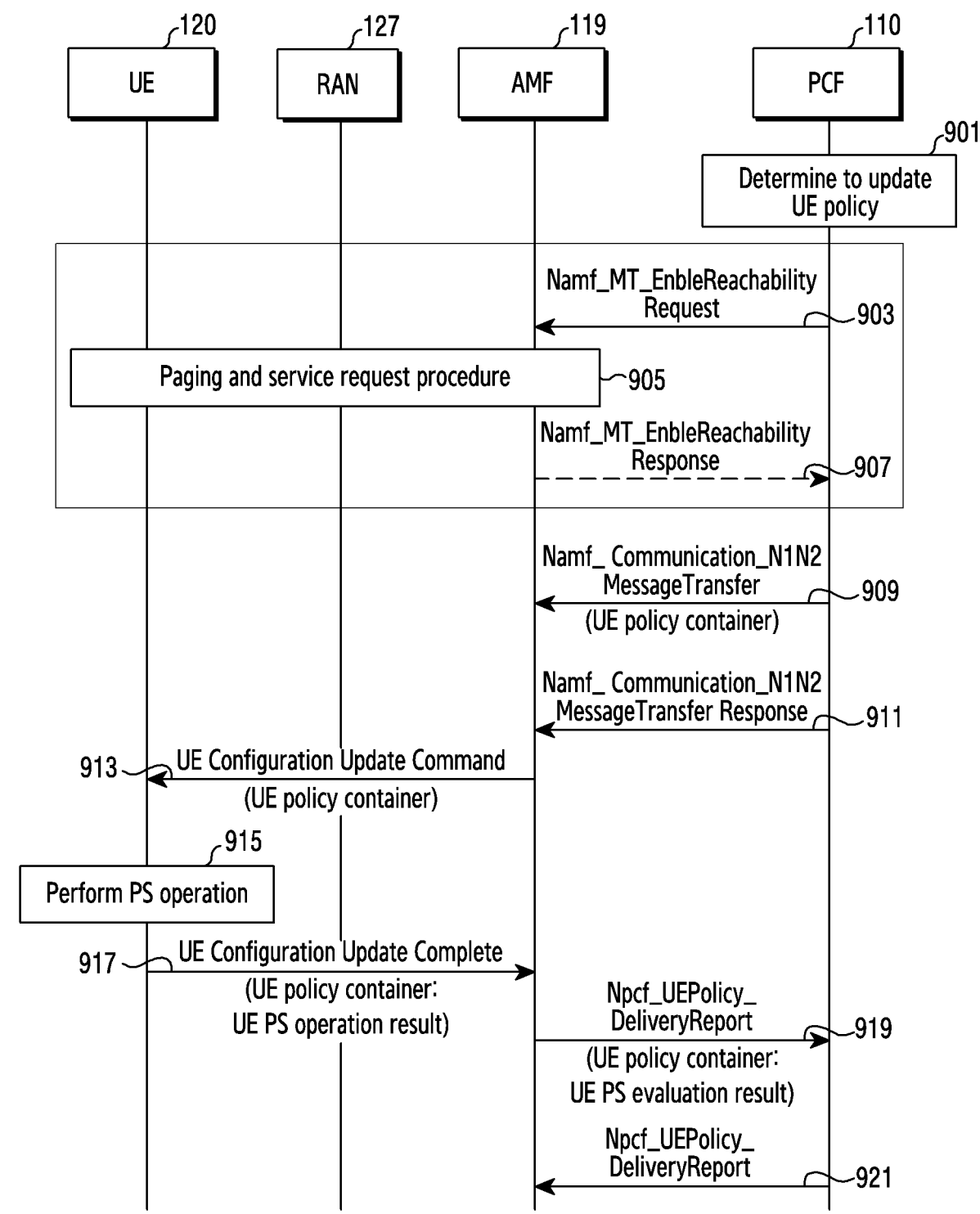
FIG. 9 illustrates a signal flow diagram of a procedure of transferring a UE policy in a paging process of a UE in a wireless communication system according to various embodiments of the disclosure.

FIG. 9 illustrates a signal flow diagram of a procedure of transferring a UE policy in a paging process of a UE in a wireless communication system according to various embodiments of the disclosure. FIG. 9 illustrates a signal flow between the PCF node 110, the AMF node 119, and the AMF 120. The operations performed in operations 913, 915, 917, 919, and 921 in FIG. 9 are the same as the operations performed in operations 713, 715, 717, 719, and 721 in FIG. 7, respectively.

Referring to FIG. 9, in operation 901, the PCF node 110 determines to transfer a UE policy. In other words, the PCF node 110 determines to update a UE policy. The PCF node 110 may determine, based on a pre-configured condition, to transfer a UE policy. For example, if a registration procedure or an initial registration procedure has been performed successfully, the PCF node 110 may determine to transfer a UE policy. As another example, if addition, modification, and/or removal of a policy section in a UE policy is required, the PCF node 110 may determine to transfer a UE policy.

In operation 903, the PCF node 110 transmits, to the AMF node 119, a message of requesting execution of a paging procedure, if the UE is in a CM-IDLE state. For example, the PCF node 110 may transfer an Namf_MT_EnableReachability request message to the AMF node 119, to request the AMF node 119 to perform a paging procedure.

In operation 905, the AMF node 119 performs the paging procedure for the UE 120. The AMF node 119 transmits a paging message including a paging request to the UE 120, and the UE 120 having received the paging request performs a service request procedure triggered by the UE in response to the paging request. If the paging procedure is successfully performed, the UE 120 may change to a CM-CONNECTED state.

In operation 907, the AMF node 119 transmits an Namf_MT_EnableReachability response message to the PCF node 110. The AMF node 119 may transmit the Namf_MT_EnableReachability response message to the PCF node 110 in response to the Namf_MT_EnableReachability request message received in operation 903.

In operation 909, the PCF node 110 may transfer, to the AMF node 119, an Namf_communication_N1N2MessageTransfer message for requesting transfer of a UE policy container to the UE. The Namf_communication_N1N2MessageTransfer message may include at least one of a UE identifier (e.g. an SUPI or a GPSI), a UE policy container, and a notification address. The UE policy container may include at least one of a UE policy section ID, the contents of a UE policy section, and an operation relating to a UE policy.

In operation 911, the AMF node 119 transfers an Namf_communication_N1N2MessageTransfer_Response message to the PCF node 110 in response to the Namf_communication_N1N2MessageTransfer message in operation 705.

According to various embodiments of the disclosure, a PCF node may transfer a plurality of UE policy sections to a UE, and the UE may enforce a rule (e.g. a URSP rule, or an ANDSP rule) of the plurality of UE policy sections.

The PCF node may transfer a plurality of UE policy containers to the UE by performing at least one UE policy delivery procedure. For example, the PCF node may transfer a plurality of UE policy containers to the UE by performing one time UE policy delivery procedure (e.g. one of the UE policy delivery procedures illustrated in FIGS. 6 to 9). As another example, the PCF node may perform a plurality of UE policy delivery procedures to transfer a plurality of UE policy containers to the UE through the plurality of UE policy delivery procedures, respectively.

The PCF node may transfer a UE policy container including a UE policy (e.g. a policy related to UE access selection, such as an ANDSP, and/or a policy related to a PDU session) to the UE through an AMF node. The UE policy container may include a list of UE policy section entries. Each of the policy section entries may include a policy section identifier (PSI) and a policy section rule relating to the PSI. A policy section rule may include a URSP rule and/or a WLAN selection policy rule (WLANSP rule).

If the PCF node determines to perform a plurality of UE policy delivery procedures for a reason (e.g. a limit of the size of a UE policy container), the PCF node may sequentially perform the plurality of UE policy delivery procedures. When the PCF node performs the last UE policy delivery procedure, the PCF node may indicate, to the UE, that the corresponding UE policy delivery procedure is the last UE policy delivery procedure, and may transfer, to the UE, a UE policy container including a last transaction indicator so that the UE starts to enforce a received UE policy. Each of UE policy containers may include a sequence number, and an indicator (or an indicator indicating the last transaction) indicating that UE policies required to be transferred to the UE have been delivered all. The UE may receive a plurality of UE policy containers, and may receive operations relating to policy sections included in the received UE policy containers. In addition, if a lastly received UE policy includes an enforcement indicator, the UE may enforce received rules.

If the UE receives an indicator indicating the last transaction, the UE may inspect the accuracy (e.g. inspect for an omitted component in a rule, or inspect for a conflicting rule) of a received UE policy. In addition, the UE may add, replace, or remove rules included in the plurality of UE policy containers, and then enforce a newly installed rule. The UE may update a UE policy stored in the UE to a UE policy (e.g. a policy related to UE access selection, such as an ANDSP, and/or a policy related to a PDU session) received from the PCF node.

According to an embodiment, if a UE policy relating to a PSI received by the UE does not exist in the UE, the UE may install (or store) a policy section entry received from the PCF node.

As another example, if a UE policy relating to a PSI received by the UE already exists in the UE, the UE may replace an existing UE policy with a policy section entry received from the PCF node.

As another example, if a PSI value exists in a policy section entry received by the UE, but there is no policy rule (e.g. an ANDSP rule, or a URSP rule) therein, the UE may remove the corresponding policy section entry from the UE.

According to various embodiments of the disclosure, the indicator indicating the last transaction may be included in a UEConfiguration_Update_Command message. The UEConfiguration_Update_Command message may be expressed as shown in Table 3 below.

TABLE 3

| IEI | Information Element | Type | Presence | Format | Length |
|---|---|---|---|---|---|
| | Extended protocol discriminator | extended protocol discriminator | M | V | 1 |
| | Security header type | security header type | M | V | ½ |
| | Spare half octet | spare half octet | M | V | ½ |
| | Transparent Configuration update command message identity | message type | M | V | 1 |
| | Configuration update indication | configuration update indication | M | V | ½ |
| | Spare half octet | spare half octet | M | V | ½ |
| X | Last transaction indicator (LTI) | the indicator indicates whether the UE policy container is the last one | M | TV | 1 |

TABLE 3-continued

| IEI | Information Element | Type | Presence | Format | Length |
|---|---|---|---|---|---|
| Y | Sequence number | the sequence number of the UE policy container | O | TV | 1 |
|  | UE policy container | UE policy container |  | TLV-E | 3 – N |

The "M" in the presence item in Table 3 implies "mandatory", and implies that a corresponding information element is required to be necessarily included in the UEConfiguration_Update_Command message. In addition, in the format item, the "V" implies a value, "TV" implies a type and a value, and "TLV-E" implies an extensible type-length-value (TLV). The LTI shown in Table 3 may be encoded as illustrated in FIG. 10.

Figure 10:
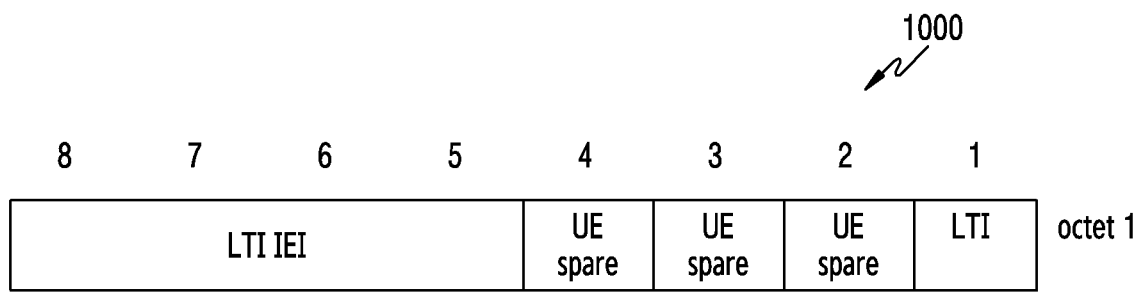
FIG. 10 illustrates a configuration of a message including a last transaction indicator (LTI) in a wireless communication system according to various embodiments of the disclosure.

FIG. 10 illustrates a configuration of a message 1000 including an LTI in a wireless communication system according to various embodiments of the disclosure. According to various embodiments of the disclosure, the message 1000 may be a UEConfiguration_Update_Command message, and may be a Transparent_DL-NAS_Transport message.

Referring to FIG. 10, the message 1000 may be transferred in a UE direction (e.g. a direction from the PCF node and/or the AMF node to the UE) in a network. In octet 1, bit 1 may be coded with an LTI. In other words, one bit may be allocated for the LTI. For example, if the value of the LTI is 0, the LTI may indicate that there is an additional transaction, and if the value of the LTI is 1, the LTI may indicate that the corresponding transaction is the last transaction. Bits 2, 3, and 4 are spare bits, and may be coded to 0. Bits 5, 6, 7, and 8 may be coded with an LTI information element identifier (IEI).

As illustrated in Table 3 and FIG. 10, an LTI may be included in the message 1000 together with a UE policy container, to indicate whether the corresponding transaction is the last transaction, or whether there is an additional transaction.

For example, when the PCF node transfers five UE policy containers, a policy delivery procedure as illustrated in FIGS. 6 to 9 may be performed by 5 times, and a single UE policy container may be transmitted to the UE through each of the policy delivery procedures (i.e. transactions), respectively. In this case, LTIs included in messages transferred in the first to fourth transactions to the UE may be configured to 0, so as to indicate that there is a UE policy to be transferred through an additional transaction, which is still remaining. In addition, an LTI included in a message transferred in the fifth transaction to the UE may be configured to 1, so as to indicate that the corresponding transaction is the last transaction.

As another example, if a transaction is the last transaction, a message transferred to the UE in the corresponding transaction may include an LTI, and if the transaction is not the last transaction, a message transferred to the UE in the corresponding transaction may not include an LTI.

According to various embodiments of the disclosure, if a plurality of UE plurality containers are all transferred, the PCF node may allow the UE to perform an operation relating to a UE policy. For example, a message transferred to the UE in the last transaction may include an LTI and/or an indicator (e.g. a policy operation enforcement permission indicator, a policy installation (addition, replacement, and removal of a policy) indicator, or a policy enforcement permission indicator) indicating permission of policy enforcement. The PCF node may allow the UE to perform an operation relating to the contents included in a transferred UE policy container, in response to the indicator indicating permission of policy enforcement.

According to various embodiments of the disclosure, the PCF node may transfer, to the UE, a UE policy container including a UE policy operation and policy section entries through the AMF. A UE policy operation may include a list (i.e. a list of PSIs added, replaced, or removed) of PSIs required to be installed. A policy section entry may be the contents of a policy section, and each policy section entry may include a PSI, and a URSP rule and/or a WLAN selection policy rule (a WLANP rule) for the PSI.

If the PCF node determines to transfer a UE policy through a plurality of transactions (e.g. a case where the size of a transfer protocol is limited), the PCF node may sequentially transfer policy section entries, and may transfer a UE policy operation through the last transaction.

According to various embodiments of the disclosure, an indicator (i.e. an LTI) indicating whether the corresponding transaction is the last transaction may be included in a UE policy container.

A UE policy container may be generated by the PCF node, and may be transferred to the AMF node by the PCF node. The AMF node may transfer the UE policy container to the UE. The AMF node may transfer the UE policy container to the UE through a UEConfiguration_Update_Command message or a DL-NAS_Transport message. If an LTI is included in the UE policy container, the UEConfiguration_Update_Command message may be expressed as shown in Table 4 below.

TABLE 4

| IEI | Information Element | Type | Presence | Format | Length |
|---|---|---|---|---|---|
|  | Extended protocol discriminator | extended protocol discriminator | M | V | 1 |
|  | Security header type | security header type | M | V | ½ |
|  | Spare half octet | spare half octet | M | V | ½ |
|  | Transparent Configuration update command message identity | message type | M | V | 1 |

TABLE 4-continued

| IEI | Information Element | Type | Presence | Format | Length |
|---|---|---|---|---|---|
| | Configuration update indication | configuration update indication | M | V | ½ |
| | Spare half octet | spare half octet | M | V | ½ |
| | UE policy container | UE policy container | | TLV-E | 3 – N |

Hereinafter, a configuration of a UE policy container will be described with reference to FIG. 11.

FIG. 11 illustrates a configuration of a UE policy container 1100 in a wireless communication system according to various embodiments of the disclosure.

Referring to FIG. 11, the UE policy container 1100 may include at least one of the elements as described below.

LTI: an indicator indicating that the corresponding transaction is the last transaction. If the value of an LTI is 0, bits for a forcible enforcement indication and an indicator (allow to activate UE policy enforcement, AAE) for activating UE policy enforcement are not used.

Sequence number presence identifier (SNPI): an indicator indicating a sequence number AAE: An indicator for allowing the UE to start policy enforcement FEI: An indicator indicating forcible execution of a rule to be transferred Sequence number: the sequence number of a UE policy container. Alternatively, a sequence number of the UE policy container, performed as one arrangement in the PCF node. The sequence number of a transaction, in which the corresponding UE policy container is included, among a plurality of transactions The configuration of the UE policy container 1100 illustrated in FIG. 11 merely corresponds to an example, and various modifications are possible. For example, the UE policy container 1100 may be included in a message (e.g. a UEConfiguration_Update_Command message, or a Transparent_DL-NAS_Transport message) transferring the UE policy container while an LTI is omitted. In addition, the UE policy container 1100 may include an indicator indicating enforcement of a UE policy without service interruption.

According to various embodiments of the disclosure, the UE having received a message including a UE policy container through the last transaction may identify the accuracy of the received UE policy. For example, the UE may identify whether all entries of policy sections with respect to a list of PSIs required to be installed have been received, whether an omitted component of a rule exists, and/or whether conflicting rules exist.

In addition, the UE may perform the operation as below for each of policy section entries according to a list of PSIs required to be installed:

if a policy relating to a corresponding PSI does not exist in the UE, the UE stores and installs a rule included in a policy section entry.

if a policy relating to a corresponding PSI exists in the UE, the UE replaces an existing policy with a rule included in a policy section entry.

if a policy section entry according to a list of PSIs indicated to be removed exists in the UE, the UE removes the policy section entry. Alternatively, if a policy section entry of a PSI is empty, the UE removes a rule of a policy section corresponding to the PSI.

If the UE adds, replaces, or removes a UE policy received from the PCF node, the UE may transfer an installed-PSI list to the PCF node through the AMF node so as to indicate complete understanding of the installed policy.

The UE may transfer a message including a result of execution of a PS operation through AMF node to the PCF node. If the UE performs a PS operation indicated by the PCF node, the UE may transfer an installed-PSI list to the PCF so as to indicate an installed UE policy. Moreover, if there is a problem for the UE in starting enforcement of the entirety or a part of a received UE policy, the UE may transfer, to the PCF node, a UE policy rejection reason (the reason for UE policy failure) and additional response information relating to the UE policy. According to various embodiments of the disclosure, the UE policy rejection reason may include at least one of the pieces of information as below.

It is impossible to install a new policy due to lack of UE resources.

It is impossible to interpret the contents of a UE policy (e.g. the type of encoding is wrong).

It is impossible to install a UE policy due to an error in a rule of the UE policy. For example, there are overlapping rules or conflicting rules.

UE policies cannot be installed

UE policies cannot be enforced

The additional response information relating to a UE policy may include an additional description relating to a cause for which the UE rejects to perform a PS operation and/or enforce the UE policy, or information relating to an issue that may potentially occur or has occurred in a UE policy installation and enforcement process even in a case where the UE policy has been performed successfully. For example, the additional response information relating to a UE policy may include information indicating non-enforcement of the policy. The information indicating non-enforcement of a policy may include information (e.g. a PSI) through which a non-enforced policy rule is distinguishable, and information (e.g. information indicating that a policy rule has not been enforced due to a user preference configuration, or that a policy rule has not been enforced according to a precedence transferred by the PCF node) indicating a reason why a policy rule is not enforced.

According to various embodiments of the disclosure, the UE may determine a method for enforcing a UE policy. With respect to a URSP rule and an ANSDP rule installed successfully, the UE may determine to accept interruption of an existing application traffic connection, and immediately enforce the rules. In other words, the UE may perform forcible enforcement and/or immediate enforcement (immediate or prompt enforcement) of installed URSP and ANSDP rules. Meanwhile, the UE may determine to postpone enforcement of rules causing interruption of an existing application traffic connection, and enforce a policy later so as to prevent occurrence of service disconnection. In other words, the UE may perform enforcement without service disconnection (graceful enforcement) with respect to installed URSP and ANSDP rules. Whether the UE performs forcible enforcement or immediate enforcement, or performs enforcement without service disconnection with respect to an installed rule may be determined based on an internal policy of the UE, a user preference configuration, and/or an indicator (e.g. a forcible enforcement indication) transferred from the PCF node. If the forcible enforcement indication is received from the PCF node, the UE may determine a method for enforcing a UE policy according to the forcible enforcement indication.

According to various embodiments of the disclosure, the PCF node may transfer, through a UE policy container to the UE, a temporal condition and/or a spatial condition for enforcing a UE policy transferred to the UE according to a requirement of an operator. For example, a temporal condition for enforcing a UE policy may include at least one of the contents as below.

§ After installation, immediately enforce
§ After installation, enforce within one hour
§ After installation, enforce when the UE is rebooted
§ After installation, enforce when the UE enters into an air plane mode
§ After installation, enforce when an air plane mode is released
§ After installation, enforce when a roaming mode is activated
§ After installation, enforce at a particular time point (e.g. noon on 1 May 2018)

For example, a spatial condition for enforcing a UE policy may include at least one of the contents as below.

§ After installation, enforce if a particular PLMN is detected
§ After installation, enforce if a particular wireless interface (an air interface) (e.g. 5G new radio (NR), LTE, enhanced LTE (eLTE), 3G, or 2G) is detected
§ After installation, enforce if voice over LTE (VoLTE) is available
§ After installation, enforce if an LADN DNN is discovered
§ After installation, enforce if the UE is located in a particular space determined based on a global positioning system (GPS)
§ After installation, enforce if a particular Wi-Fi SSID is scanned According to various embodiments, the UE may transfer a UE policy container including an operating system identifier (OSId) of the UE to the PCF node. For example, if a UE policy is not stored in the UE, a USIM is changed, or a change of the operating system (OS) of the UE is detected, the UE may transmit a message (i.e. an initial registration message or a registration request message) for initial registration to a base station. The UE may include the operating system identifier (OSId) of the UE in a UE policy container included in an initial registration message, and may transmit the UE policy container including the OSId through the initial registration message (or registration request message) to the base station. The base station may transfer the registration request message received from the UE to the AMF node, and the registration request message transferred to the AMF may also include the OSId of the UE.

In various embodiments, the UE policy container may further include a list of PSIs as well as the OSId of the UE 120.

In various embodiments, the OSId of the UE 120 may indicate an operating system (OS) providing an execution environment for operating various application programs in the UE 120. For example, the value of the OSId may indicate an OS such as Android, iOS, Tizen, and/or a wearable OS. The OSs described above correspond to examples, and OSs indicatable by OSIds are not limited thereto.

For example, an OSID may be expressed as shown in Table 5 below.

TABLE 5

| Field name | Value (1 octet) | Description |
| --- | --- | --- |
| OSId | 1 - Android, 2 - iOS<br>3 - Tizen<br>4 - wearable OS | UE operating system identifier |

As another example, an OSID may further include an OS version field as shown in Table 6 below.

TABLE 6

| Field name | Value (1 octet) | Description |
| --- | --- | --- |
| OSId | 1 - Android<br>2 - iOS<br>3 - Tizen<br>4 - wearable OS | UE operating system identifier |
| OS version | numeric value | UE OS version field |

The UE may transfer a UE policy container including the OSId of the UE to the AMF node, and the AMF node may transfer, to the PCF node, the UE policy container obtained from the UE, through a message for a UE policy control create request. In other words, the AMF node may transfer a UE policy control create request message including a UE policy container to the PCF node, and the UE policy container may include the OSId of the UE. The PCF node identifies the OSId of the UE, based on the OSId obtained from the UE, and transfers at least one application identifier (AppID) for the supported OSId to the AMF node. In other words, the PCF node transfers, to the AMF node, at least one AppID supported in an OS corresponding to the OSId obtained from the UE. The PCF node may store the OSId so as to identify an AppID of the UE in future use.

Hereinafter, a signal flow for transferring, by the UE, a UE policy container including an operating system identifier (OSId) of the UE to the PCF node will be described with reference to FIG. 12.

Figure 12:
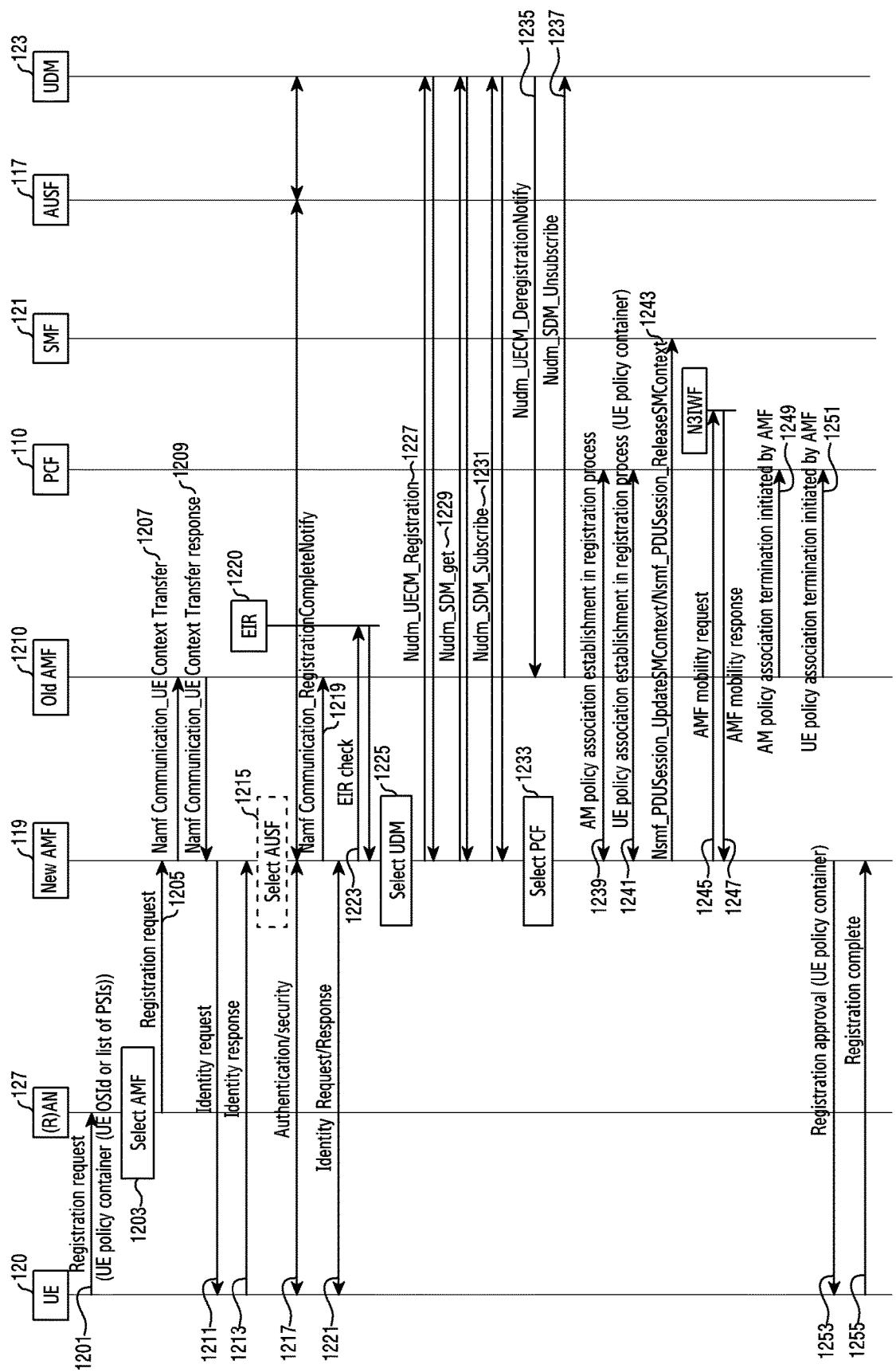
FIG. 12 illustrates a signal flow for transferring, by a UE, a UE policy container including an operating system identifier (OSId) of the UE to a PCF node in a wireless communication system according to various embodiments of the disclosure.

FIG. 12 illustrates a signal flow for transferring, by a UE, a UE policy container including an operating system identifier (OSId) of the UE to a PCF node in a wireless communication system according to various embodiments of the disclosure.

Referring to FIG. 12, in operation 1201, a UE 120 transmits a message for a registration request to a base station (e.g. the RAN 127). For example, if a UE policy is not stored in the UE 120, a USIM is changed, or a change of the operating system (OS) of the UE is detected, the UE 120 may transmit a message (i.e. an initial registration message or a registration request message) for initial registration to the base station. The UE 120 may include the operating system identifier (OSId) of the UE 120 in a UE policy container included in an initial registration message, and may transmit the UE policy container including the OSId through the initial registration message (or registration request message) to the base station. In various embodiments, the UE policy container may further include a list of PSIs as well as the OSId of the UE 120.

In operation 1203, the base station performs AMF selection. For example, the base station may select an AMF node 119. In various embodiments, the AMF node 119 selected according to AMF selection in operation 1203 may be different from an AMF 1210 previously linked to (associated with) to the UE 120. The AMF node 119 may be called a new AMF, and the AMF 1210 may be called an old AMF.

In operation 1205, the base station transfers a message for a registration request to the AMF node 119. In other words, the base station may transfer a registration request message for registration of the UE 120 with respect to a network to the AMF node 119, and the registration request message may include the OSId of the UE 120. For example, the base station may forward the registration request message received from the UE 120 in operation 1201, to the AMF node 119.

In operation 1207, the AMF node 119 transmits a message for UE context transfer to the AMF 1210. In other words, the AMF node 119 may transfers an Namf_Communication_UE_Context_Transfer message to the AMF 1210. In various embodiments, the AMF node 119 may request UE context information from the AFM 1210 through the Namf_Communication_UE_Context_Transfer message.

In operation 1209, the AMF 1210 transmits a message for UE context transfer response to the AMF node 119. In other words, the AMF 1210 may transfer an Namf_Communication_UE_Context_Transfer_Response message to the AMF node 119 in response in response to the Namf_Communication_UE_Context_Transfer message. In various embodiments, the AMF 1210 may transfer the UE context information to the AFM node 119 through the Namf_Communication_UE_Context_Transfer_Response message.

In operation 1211, the AMF node 119 transmits a message for requesting identity information of the UE 120 to the UE 120. In other words, the AMF node 119 may transfer an identity request message to the UE 120. For example, the AMF node 119 may request a subscription concealed identifier (SUCI) from the UE 120 through the identity request message.

In operation 1213, the UE 120 transmits an identity response message to the AMF node 119 in response to the identity request. For example, the UE 120 may transfer an identity response message including the SUCI requested by the AMF node 119, to the AMF node 119.

In operation 1215, the AMF node 119 performs AUSF selection. In other words, the AMF node 119 may select an AUSF node so as to initiate authentication of the UE 120. For example, the AMF node 119 may select an AUSF node 117 according to the AUSF selection.

In operation 1217, an authentication and security procedure is performed. For example, in operation 1217, an authentication and security procedure between the UE 120 and the AMF node 119, an authentication and security procedure between the AMF node 119 and the AUSF node 117, and an authentication and security procedure between the AUSF node 117 and an UDM node 117 may be performed.

In operation 1219, the AMF node 119 transmits a message for registration complete notification to the AMF node 1210. In other words, the AMF node 119 transfers an Namf_Communication_RegistrationCompleteNotify message to the AMF node 1210. For example, the AMF node 119 may notify the AMF node 1210 that registration of the UE 120 is complete in the AMF node 119, through the Namf_Communication_RegistrationCompleteNotify message.

In operation 1221, the AMF node 119 transmits an identity request message to the UE 120, and the UE 120 transmits an identity response message to the AMF node 119. For example, the AMF node 119 may request a permanent equipment identifier (PEI) from the UE 120 through an identity request message, and the UE 120 may transfer an identity response message including the PEI to the AMF node 119.

In operation 1223, the AMF node 119 and an equipment identity register (EIR) node 1220 perform EIR check. For example, the AMF node 119 transmits a message for requesting EIR check to the EIR node 1220. For example, the AMF node 119 may transmit an EIR check request message including the PEI to the EIR node 1220, and the EIR 1220 may identify the PEI, and then transmit an EIR check response message including a result of identification of the PEI to the AMF 119. In various embodiments, the EIR node 1220 may control an access to a wireless communication network.

In operation 1225, the AMF node 119 performs UDM selection. For example, the AMF node 119 may select the UDM node 123 according to the UDM selection.

In operation 1227, the AMF node 119 and the UDM node 123 perform UE context management (UECM) registration. In other words, the AMF node 119 and the UDM node 123 perform an Nudm_UECM_Registration procedure. In a UECM registration procedure, the AMF node 119 performs registration in the UDM node 123.

In operation 1229, the AMF node 119 and the UDM node 123 perform a subscriber data management (SDM) acquisition procedure. In other words, the AMF node 119 and the UDM node 123 perform an Nudm_SDM_get procedure. In the SDM acquisition procedure, the AMF node 119 may obtain access and mobility subscription data, SMF selection subscription data, and UE context from the UDM node 123.

In operation 1231, the AMF node 119 and the UDM node 123 perform a SDM subscription procedure. In other words, the AMF node 119 and the UDM node 123 perform an Nudm_SDM_Subscribe procedure. For example, the UDM node 123 may perform subscription by using the Nudm_SDM_Subscribe procedure for notification.

In operation 1233, the AMF node 119 performs PCF selection. For example, the AMF node 119 may select a PCF node 110 according to the PCF selection.

In operation 1235, the UDM node 123 transfers a message for UECM deregistration notification to the AMF node 1210. In other words, the UDM node 123 transfers an Nudm_UECM_DeregistrationNotify message to the AMF node 1210. According to the Nudm_UECM_DeregistrationNotify, the AMF node 1210 removes the UE context.

In operation 1237, the AMF node 119 transfers a message for SDM unsubscription to the UDM node 123. In other words, the AMF node 119 transfers an Nudm_SDM_Unsubscribe message to the UDM node 123. According to the Nudm_SDM_Unsubscribe, the AMF node 1210 releases the subscription to the UDM node 123.

In operation 1239, the AMF node 119 and the PCF node 110 perform a procedure for access and mobility (AM) policy association establishment in the registration process. The AMF node 119 may receive required information from the PCF node 110 to establish an AM policy association with respect to the UE 120.

In operation 1241, the AMF node 119 and the PCF node 110 perform a procedure for UE policy association establishment in the registration process. According to various embodiments, in the procedure for UE policy association establishment, the UE 120 may transfer a UE policy container including the OSId of the UE 120 to the AMF node 119, and the AMF node 119 may transfer, to the PCF node 110, the UE policy container obtained from the UE 120, through a message for a UE policy control create request. In other words, the AMF node 119 may transfer a UE policy control create request message including a UE policy container to the PCF node 110, and the UE policy container may include the OSId of the UE. The PCF node 110 identifies the OSId of the UE 120, based on the OSId obtained from the UE 120, and transfers at least one application identifier (AppID) for the supported OSId to the AMF node 119. In other words, the PCF node 110 transfers, to the AMF node 119, at least one AppID supported in an OS corresponding to the OSId obtained from the UE 120. The PCF node 110 may store the OSId so as to identify an AppID of the UE 120 in future use.

In operation 1243, the AMF node 119 may perform an Nsmf_PDUSession_UpdateSMContext or Nsmf_PDUSession_ReleaseSMContext procedure. For example, the AMF node 119 may request an SMF node 121 to update a PDU session for the UE 120 (Nsmf_PDUSession_UpdateSMContext), and/or may request the SMF node 121 to release a PDU session for the UE 120 (Nsmf_PDUSession_ReleaseSMContext).

In operation 1245, the AMF node 119 transmits a message for AMF mobility request to a non-3GPP inter-working function (N3IWF) node 1230. In other words, the AMF node 119 transfers an N2_AMF_Mobility_Request message to the N3IWF node 1230. In operation 1247, the N3IWF node 1230 transmits a message for AMF mobility response to the AMF node 119. In other words, the N3IWF node 1230 transfers an N2_AMF_Mobility_Response message to the AMF node 119 in response to the N2_AMF_Mobility_Request message. Through exchange between the N2_AMF_Mobility_Request message and the N2_AMF_Mobility_Response message, the AMF node 119 generates a next generation application protocol (NGAP) UE association toward the N3IWF node 1230 to which the UE 120 is connected.

In operation 1249, the AMF node 1210 performs an AM policy association termination procedure together with the PCF node 110. The AMF node 1210 may delete the AM policy association with the PCF node 110.

In operation 1251, the AMF node 1210 performs a UE policy association termination procedure together with the PCF node 110. The AMF node 1210 may delete the UE policy association with the PCF node 110.

In operation 1253, the AMF node 119 transfers a message for registration approval to the UE 120. In other words, the AMF node 119 may transfer a registration approval message to the UE 120. The registration approval message may include a UE policy container.

In operation 1255, the UE 120 transfers a registration complete message to the AMF node 119. Through the registration complete message, the UE 120 may notify the AMF node 119 that the UE 120 has been updated successfully.

According to various embodiments, a UE may transfer the OSId of the UE to an AMF node, and the AMF node may transfer the OSId of the UE obtained from the UE, to a PCF node. For example, the UE may transfer the OSId to the AMF node in a PEI identification procedure.

A network operator configured to apply UE policies may configure whether to apply a UE policy. In a case where the network operator is linked to a roaming operator, the network operator may configure whether to apply a UE policy for each of roaming operators compacting therewith.

According to various embodiments, the AMF may determine whether to perform PEI identification, based on configuration information at the time of initial registration. The AMF may request the UE to transfer the OSId in a process of performing PEI identification. The UE requested by the AMF to transfer the OSId may transfer the OSID to the AMF. The AMF may receive PEI information from the UE, and may transfer the PEI information of the UE to the PCF node in a UE policy association establishment process.

Hereinafter, a signal flow for transferring an OSId to the AMF node in a PEI identification procedure will be described with reference to FIG. 13.

Figure 13:
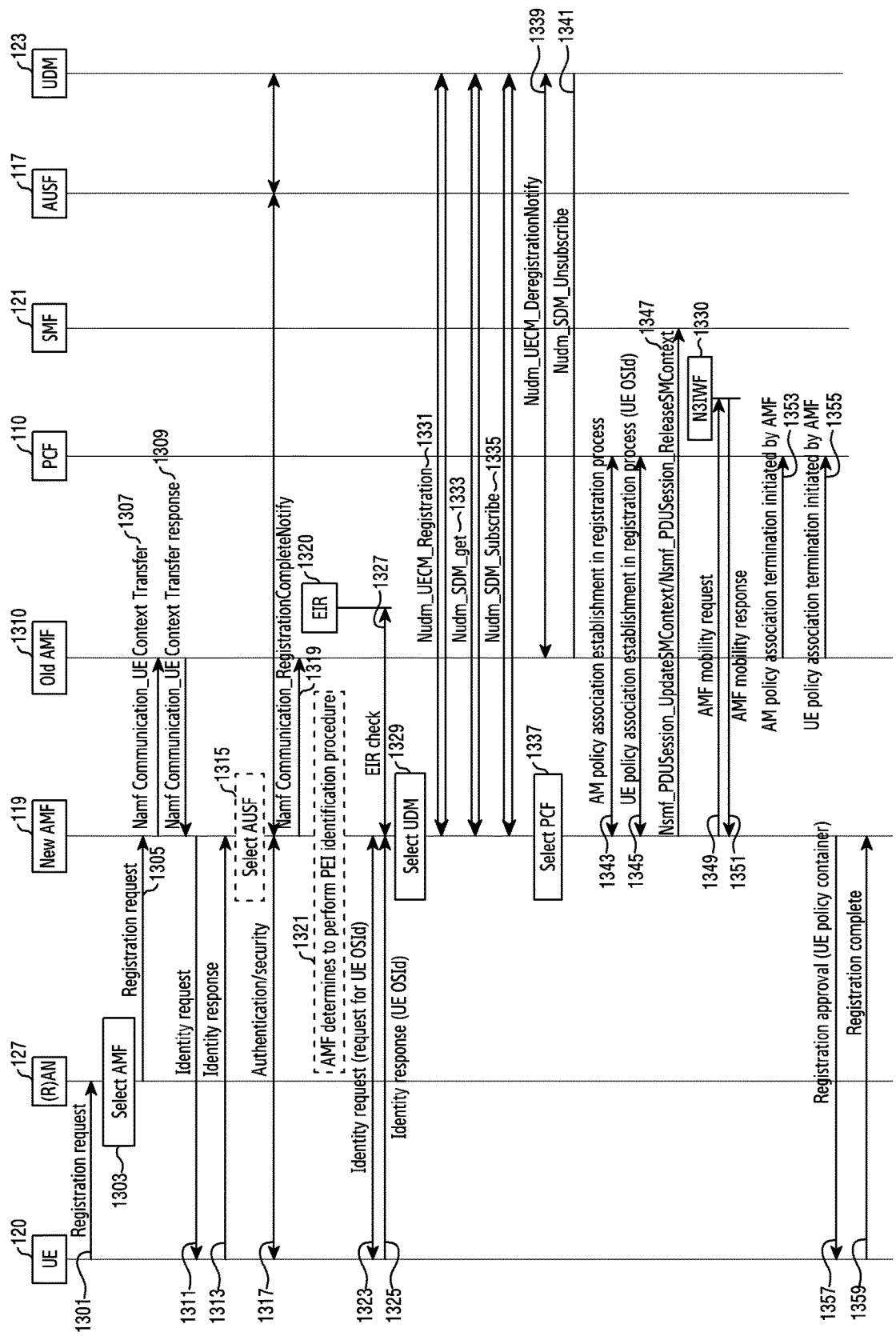
FIG. 13 illustrates a signal flow for transferring an OSId to an AMF node in a PEI identification procedure in a wireless communication system according to various embodiments of the disclosure.

FIG. 13 illustrates a signal flow for transferring an OSId to an AMF node in a PEI identification procedure in a wireless communication system according to various embodiments of the disclosure.

Referring to FIG. 13, in operation 1301, a UE 120 transmits a message for a registration request to a base station (e.g. the RAN 127). The UE 120 may transmit a request message for registration in a network to the base station.

In operation 1303, the base station performs AMF selection. For example, the base station may select an AMF node 119. In various embodiments, the AMF node 119 selected according to AMF selection in operation 1303 may be different from an AMF 1310 previously linked to (associated with) to the UE 120. The AMF node 119 may be called a new AMF, and the AMF 1310 may be called an old AMF.

In operation 1305, the base station transfers a message for a registration request to the AMF node 119. In other words, the base station may transfer a registration request message for registration of the UE 120 with respect to the network to the AMF node 119. For example, the base station may forward the registration request message received from the UE 120 in operation 1301, to the AMF node 119.

In operation 1307, the AMF node 119 transmits a message for UE context transfer to the AMF 1310. In other words, the AMF node 119 may transfers an Namf_Communication_UE_Context_Transfer message to the AMF 1310. In various embodiments, the AMF node 119 may request UE context information from the AFM 1310 through the Namf_Communication_UE_Context_Transfer message.

In operation 1311, the AMF 1310 transmits a message for UE context transfer response to the AMF node 119. In other words, the AMF 1310 may transfer an Namf_Communication_UE_Context_Transfer_Response message to the AMF node 119 in response to the Namf_Communication_UE_Context_Transfer message. In various embodiments, the AMF 1310 may transfer the UE context information to the AFM node 119 through the Namf_Communication_UE_Context_Transfer_Response message.

In operation 1311, the AMF node 119 transmits a message for requesting identity information of the UE 120 to the UE 120. In other words, the AMF node 119 may transfer an identity request message to the UE 120. For example, the AMF node 119 may request a subscription concealed identifier (SUCI) from the UE 120 through the identity request message.

In operation 1313, the UE 120 transmits an identity response message to the AMF node 119 in response to the identity request. For example, the UE 120 may transfer an identity response message including the SUCI requested by the AMF node 119, to the AMF node 119.

In operation 1315, the AMF node 119 performs AUSF selection. In other words, the AMF node 119 may select an AUSF node so as to initiate authentication of the UE 120. For example, the AMF node 119 may select an AUSF node 117 according to the AUSF selection.

In operation 1317, an authentication and security procedure is performed. For example, in operation 1217, an authentication and security procedure between the UE 120 and the AMF node 119, an authentication and security procedure between the AMF node 119 and the AUSF node 117, and an authentication and security procedure between the AUSF node 117 and an UDM node 117 may be performed.

In operation 1319, the AMF node 119 transmits a message for registration complete notification to the AMF node 1310. In other words, the AMF node 119 transfers an Namf_Communication_RegistrationCompleteNotify message to the AMF node 1310. For example, the AMF node 119 may notify the AMF node 1310 that registration of the UE 120 is complete in the AMF node 119, through the Namf_Communication_RegistrationCompleteNotify message.

In operation 1321, the AMF node 119 determines to perform a PEI identification procedure. The AMF node 119 may determine to perform PEI identification, based on configuration information, at the time of initial registration.

In operation 1323, the AMF node 119 transfers an identity request message to the UE 120. The AMF node 119 may request a permanent equipment identifier (PEI) to the UE 120 through the identity request message. In various embodiments, the AMF node 119 may request the UE 120 to transfer the OSId, through the identity request message.

In operation 1325, the UE 120 transmits an identity response message to the AMF node 119. The UE 120 may transfer an identity response message including the PEI to the AMF node 119. In various embodiments, the identity response message may further include the OSId of the UE 120. In in other words, the UE 120 requested by the AMF node 119 to transfer the OSId may transfer the OSId of the UE 120 to the AMF node 119 through the identity response message.

In operation 1327, the AMF node 119 and an equipment identity register (EIR) node 1320 perform EIR check. For example, the AMF node 119 transmits a message for requesting EIR check to the EIR node 1320. For example, the AMF node 119 may transmit an EIR check request message including the PEI to the EIR node 1320, and the EIR 1320 may identify the PEI, and then transmit an EIR check response message including a result of identification of the PEI to the AMF 119. In various embodiments, the EIR node 1320 may control an access to a wireless communication network.

In operation 1329, the AMF node 119 performs UDM selection. For example, the AMF node 119 may select the UDM node 123 according to the UDM selection.

In operation 1331, the AMF node 119 and the UDM node 123 perform UE context management (UECM) registration. In other words, the AMF node 119 and the UDM node 123 perform an Nudm_UECM_Registration procedure. In a UECM registration procedure, the AMF node 119 performs registration in the UDM node 123.

In operation 1333, the AMF node 119 and the UDM node 123 perform a subscriber data management (SDM) acquisition procedure. In other words, the AMF node 119 and the UDM node 123 perform an Nudm_SDM_get procedure. In the SDM acquisition procedure, the AMF node 119 may obtain access and mobility subscription data, SMF selection subscription data, and UE context from the UDM node 123.

In operation 1335, the AMF node 119 and the UDM node 123 perform a SDM subscription procedure. In other words, the AMF node 119 and the UDM node 123 perform an Nudm_SDM_Subscribe procedure. For example, the UDM node 123 may perform subscription by using the Nudm_SDM_Subscribe procedure for notification.

In operation 1337, the AMF node 119 performs PCF selection. For example, the AMF node 119 may select a PCF node 110 according to the PCF selection.

In operation 1339, the UDM node 123 transfers a message for UECM deregistration notification to the AMF node 1310. In other words, the UDM node 123 transfers an Nudm_UECM_DeregistrationNotify message to the AMF node 1310. According to the Nudm_UECM_DeregistrationNotify, the AMF node 1310 removes the UE context.

In operation 1341, the AMF node 119 transfers a message for SDM unsubscription to the UDM node 123. In other words, the AMF node 119 transfers an Nudm_SDM_Unsubscribe message to the UDM node 123. According to the Nudm_SDM_Unsubscribe, the AMF node 1310 releases the subscription to the UDM node 123.

In operation 1343, the AMF node 119 and the PCF node 110 perform a procedure for access and mobility (AM) policy association establishment in the registration process. The AMF node 119 may receive required information from the PCF node 110 to establish an AM policy association with respect to the UE 120.

In operation 1345, the AMF node 119 and the PCF node 110 perform a procedure for UE policy association establishment in the registration process. In various embodiments, the AMF node 119 may receive PEI information from the UE 120, and may transfer the PEI information of the UE 120 to the PCF node 110 in a UE policy association establishment procedure. The PEI information may include at least one of the PEI and the OSId of the UE 120.

In operation 1347, the AMF node 119 may perform an Nsmf_PDUSession_UpdateSMContext or Nsmf_PDUSession_ReleaseSMContext procedure. For example, the AMF node 119 may request an SMF node 121 to update a PDU session for the UE 120 (Nsmf_PDUSession_UpdateSMContext), and/or may request the SMF node 121 to release a PDU session for the UE 120 (Nsmf_PDUSession_ReleaseSMContext).

In operation 1349, the AMF node 119 transmits a message for AMF mobility request to a non-3GPP inter-working function (N3IWF) node 1330. In other words, the AMF node 119 transfers an N2_AMF_Mobility_Request message to the N3IWF node 1330. In operation 1351, the N3IWF node 1330 transmits a message for AMF mobility response to the AMF node 119. In other words, the N3IWF node 1330 transfers an N2_AMF_Mobility_Response message to the AMF node 119 in response to the N2_AMF_Mobility_Request message. Through exchange between the N2_AMF_Mobility_Request message and the N2_AMF_Mobility_Response message, the AMF node 119 generates a next generation application protocol (NGAP) UE association toward the N3IWF node 1330 to which the UE 120 is connected.

In operation 1353, the AMF node 1310 performs an AM policy association termination procedure together with the PCF node 110. The AMF node 1310 may delete the AM policy association with the PCF node 110.

In operation 1355, the AMF node 1310 performs a UE policy association termination procedure together with the PCF node 110. The AMF node 1310 may delete the UE policy association with the PCF node 110.

In operation 1357, the AMF node 119 transfers a message for registration approval to the UE 120. In other words, the AMF node 119 may transfer a registration approval message to the UE 120. The registration approval message may include a UE policy container.

In operation 1359, the UE 120 transfers a registration complete message to the AMF node 119. Through the registration complete message, the UE 120 may notify the AMF node 119 that the UE 120 has been updated successfully.

In various embodiments, an AMF node may perform a PEI identification procedure, and then transfer PEI information to a PCF node. The PCF node may obtain an OSId from a PEI by using an internal database.

In a case where a URSP is used by a network operator, the PCF node may use a PEI so as to select an appropriate URSP for a UE. For example, the PCF node may obtain an OSId from a PEI by using the internal database. In a non-roaming scenario, in order to obtain PEI information of the UE, the AMF node may perform a PEI identification procedure in an initial registration procedure of the UE in a case where a PLMN is configured to provide a URSP.

In a roaming scenario, according to a roaming operator agreement, an AMF of a visitor public land mobile network (VPLMN) performs a PEI identification procedure, and transfers a PEI to a home-PCF (H-PCF). The home-PCF (H-PCF) of a home public land mobile network (HPLMN) obtains a proper OSId from PEI information transferred by the AMF of the VPLMN, by using an internal database.

In a case where an AMF is linked to a roaming operator, the AMF may configure whether to apply a UE policy for each of roaming operators compacting therewith.

At the time of initial registration, an AMF determines whether to perform PEI identification, based on configuration information. If the AMF determines to perform a PEI identification procedure, the AMF performs a procedure (i.e. an identity request to a UE, and reception of an identity response from the UE) for obtaining a PEI.

After PEI identification, the AMF transfers PEI information of the UE to a PCF. For example, the AMF may transfer the PEI of the UE to the PCF in a UE policy association establishment process. The PCF may obtain an OSId, based on relation information between the PEI (and/or an international mobile equipment identity (IMEI)) and the OSId. After acquisition, the PCF node may transfer at least one AppId relating to the OSId of the UE to the AMF node.

Hereinafter, a signal flow for obtaining an OSId from a PEI by using an internal database will be described with reference to FIG. 14.

Figure 14:
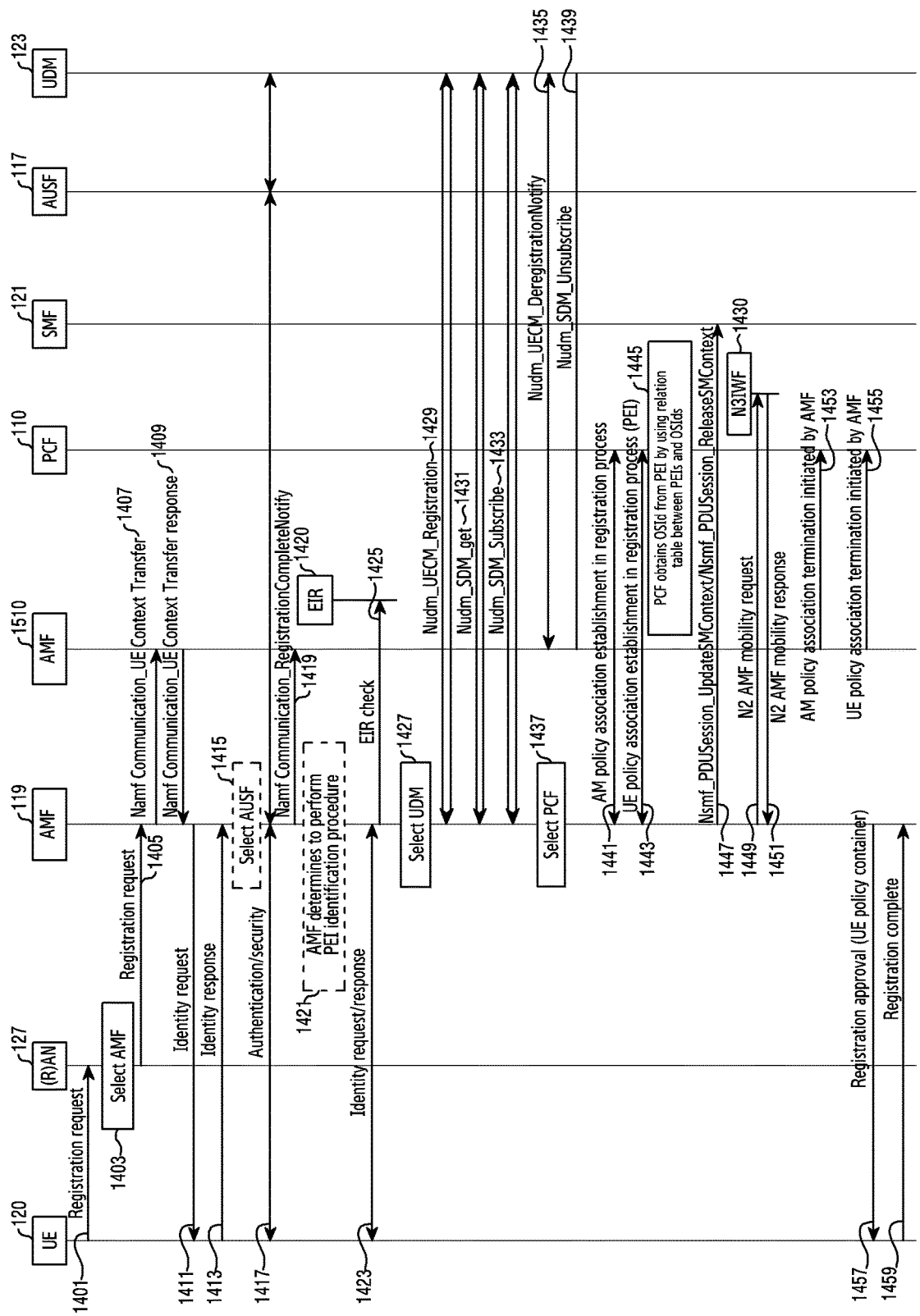
FIG. 14 illustrates a signal flow for obtaining an OSId from a PEI in a wireless communication system according to various embodiments of the disclosure.

FIG. 14 illustrates a signal flow for obtaining an OSId from a PEI in a wireless communication system according to various embodiments of the disclosure.

Referring to FIG. 14, in operation 1401, a UE 120 transmits a message for a registration request to a base station (e.g. the RAN 127). The UE 120 may transmit a request message for registration in a network to the base station.

In operation 1403, the base station performs AMF selection. For example, the base station may select an AMF node 119. In various embodiments, the AMF node 119 selected according to AMF selection in operation 1403 may be different from an AMF 1410 previously linked to (associated with) to the UE 120. The AMF node 119 may be called a new AMF, and the AMF 1410 may be called an old AMF.

In operation 1405, the base station transfers a message for a registration request to the AMF node 119. In other words, the base station may transfer a registration request message for registration of the UE 120 with respect to the network to the AMF node 119. For example, the base station may forward the registration request message received from the UE 120 in operation 1301, to the AMF node 119.

In operation 1407, the AMF node 119 transmits a message for UE context transfer to the AMF 1410. In other words, the AMF node 119 may transfers an Namf_Communication_UE_Context_Transfer message to the AMF 1410. In various embodiments, the AMF node 119 may request UE context information from the AFM 1410 through the Namf_Communication_UE_Context_Transfer message.

In operation 1409, the AMF 1410 transmits a message for UE context transfer response to the AMF node 119. In other words, the AMF 1410 may transfer an Namf_Communication_UE_Context_Transfer_Response message to the AMF node 119 in response in response to the Namf_Communication_UE_Context_Transfer message. In various embodiments, the AMF 1410 may transfer the UE context information to the AFM node 119 through the Namf_Communication_UE_Context_Transfer_Response message.

In operation 1411, the AMF node 119 transmits a message for requesting identity information of the UE 120 to the UE 120. In other words, the AMF node 119 may transfer an identity request message to the UE 120. For example, the AMF node 119 may request a subscription concealed identifier (SUCI) from the UE 120 through the identity request message.

In operation 1413, the UE 120 transmits an identity response message to the AMF node 119 in response to the identity request. For example, the UE 120 may transfer an identity response message including the SUCI requested by the AMF node 119, to the AMF node 119.

In operation 1415, the AMF node 119 performs AUSF selection. In other words, the AMF node 119 may select an AUSF node so as to initiate authentication of the UE 120. For example, the AMF node 119 may select an AUSF node 117 according to the AUSF selection.

In operation 1417, an authentication and security procedure is performed. For example, in operation 1417, an authentication and security procedure between the UE 120 and the AMF node 119, an authentication and security procedure between the AMF node 119 and the AUSF node 117, and an authentication and security procedure between the AUSF node 117 and an UDM node 117 may be performed.

In operation 1419, the AMF node 119 transmits a message for registration complete notification to the AMF node 1410. In other words, the AMF node 119 transfers an Namf_Communication_RegistrationCompleteNotify message to the AMF node 1410. For example, the AMF node 119 may notify the AMF node 1410 that registration of the UE 120 is complete in the AMF node 119, through the Namf_Communication_RegistrationCompleteNotify message.

In operation 1421, the AMF node 119 determines to perform a PEI identification procedure. The AMF node 119 may determine to perform PEI identification, based on configuration information at the time of initial registration.

In operation 1423, the AMF node 119 transmits an identity request message to the UE 120, and the UE 120 transmits an identity response message to the AMF node 119. The AMF node 119 may request a permanent equipment identifier (PEI) from the UE 120 through an identity request message, and the UE 120 may transfer an identity response message including the PEI to the AMF node 119.

In operation 1425, the AMF node 119 and an equipment identity register (EIR) node 1420 perform EIR check. For example, the AMF node 119 transmits a message for requesting EIR check to the EIR node 1420. For example, the AMF node 119 may transmit an EIR check request message including the PEI to the EIR node 1420, and the EIR 1420 may identify the PEI, and then transmit an EIR check response message including a result of identification of the PEI to the AMF 119. In various embodiments, the EIR node 1420 may control an access to a wireless communication network.

In operation 1427, the AMF node 119 performs UDM selection. For example, the AMF node 119 may select the UDM node 123 according to the UDM selection.

In operation 1429, the AMF node 119 and the UDM node 123 perform UE context management (UECM) registration. In other words, the AMF node 119 and the UDM node 123 perform an Nudm_UECM_Registration procedure. In a UECM registration procedure, the AMF node 119 performs registration in the UDM node 123.

In operation 1431, the AMF node 119 and the UDM node 123 perform a subscriber data management (SDM) acquisition procedure. In other words, the AMF node 119 and the UDM node 123 perform an Nudm_SDM_get procedure. In the SDM acquisition procedure, the AMF node 119 may obtain access and mobility subscription data, SMF selection subscription data, and UE context from the UDM node 123.

In operation 1433, the AMF node 119 and the UDM node 123 perform a SDM subscription procedure. In other words, the AMF node 119 and the UDM node 123 perform an Nudm_SDM_Subscribe procedure. For example, the UDM node 123 may perform subscription by using the Nudm_SDM_Subscribe procedure for notification.

In operation 1435, the AMF node 119 performs PCF selection. For example, the AMF node 119 may select a PCF node 110 according to the PCF selection.

In operation 1437, the UDM node 123 transfers a message for UECM deregistration notification to the AMF node 1310. In other words, the UDM node 123 transfers an Nudm_UECM_DeregistrationNotify message to the AMF node 1410. According to the Nudm_UECM_DeregistrationNotify, the AMF node 1410 removes the UE context.

In operation 1439, the AMF node 119 transfers a message for SDM unsubscription to the UDM node 123. In other words, the AMF node 119 transfers an Nudm_SDM_Unsubscribe message to the UDM node 123. According to the Nudm_SDM_Unsubscribe, the AMF node 1410 releases the subscription to the UDM node 123.

In operation 1441, the AMF node 119 and the PCF node 110 perform a procedure for access and mobility (AM) policy association establishment in the registration process. The AMF node 119 may receive required information from the PCF node 110 to establish an AM policy association with respect to the UE 120.

In operation 1443, the AMF node 119 and the PCF node 110 perform a procedure for UE policy association establishment in the registration process. In various embodiments, the AMF node 119 may transfer the PEI information of the UE 120 to the PCF node 110 in a UE policy association establishment process.

In operation 1445, the PCF node 110 obtains an OSId from the PEI by using a PEI-OSID association table. In various embodiments, the PCF node 110 may obtain the OSId of the UE 120 from the PEI by using an internal database. The internal database of the PCF node 110 may include, for example, a table showing mapping relationship (or association relationship) between PEIs and OSIds, and the PCF node 110 may search for an OSId corresponding to the PEI in the association table and/or the mapping table, to obtain the OSId of the UE 120. The PCF node 110 may transfer at least one AppId relating to the OSId of the UE 120 to the AMF node 119.

In operation 1447, the AMF node 119 may perform an Nsmf_PDUSession_UpdateSMContext or Nsmf_PDUSession_ReleaseSMContext procedure. For example, the AMF node 119 may request an SMF node 121 to update a PDU session for the UE 120 (Nsmf_PDUSession_UpdateSMContext), and/or may request the SMF node 121 to release a PDU session for the UE 120 (Nsmf_PDUSession_ReleaseSMContext).

In operation 1449, the AMF node 119 transmits a message for AMF mobility request to a non-3GPP inter-working function (N3IWF) node 1430. In other words, the AMF node 119 transfers an N2_AMF_Mobility_Request message to the N3IWF node 1430. In operation 1451, the N3IWF node 1430 transmits a message for AMF mobility response to the AMF node 119. In other words, the N3IWF node 1430 transfers an N2_AMF_Mobility_Response message to the AMF node 119 in response to the N2_AMF_Mobility_Request message. Through exchange between the N2_AMF_Mobility_Request message and the N2_AMF_Mobility_Response message, the AMF node 119 generates a next generation application protocol (NGAP) UE association toward the N3IWF node 1430 to which the UE 120 is connected.

In operation 1453, the AMF node 1410 performs an AM policy association termination procedure together with the PCF node 110. The AMF node 1410 may delete the AM policy association with the PCF node 110.

In operation 1455, the AMF node 1410 performs a UE policy association termination procedure together with the PCF node 110. The AMF node 1410 may delete the UE policy association with the PCF node 110.

In operation 1457, the AMF node 119 transfers a message for registration approval to the UE 120. In other words, the AMF node 119 may transfer a registration approval message to the UE 120. The registration approval message may include a UE policy container.

In operation 1459, the UE 120 transfers a registration complete message to the AMF node 119. Through the registration complete message, the UE 120 may notify the AMF node 119 that the UE 120 has been updated successfully.

In various embodiments, an AMF node may obtain the OSId of a UE from an EIR node, and may transfer the OSId to a PCF node.

The AMF node may determine whether to perform a PEI identification procedure, when the UE performs an initial registration procedure. As the AMF node performs a PEI identification procedure, the AMF node obtains a PEI from the UE, and the AMF node transmits an EIR check request message including the PEI to the EIR node. The AMF node may request the OSId of the UE through the EIR check request message. In other words, the EIR check request message may include information for requesting the OSId of the UE.

The EIR node checks an EIR in response to the request from the AMF, and obtains the OSId of the UE from the PEI by using an internal database (e.g. a table showing mapping relationship (or linked relationship) between PEIs and OSId). After acquisition, the EIR node transfers the OSId of the UE to the AMF node through an EIR check response message. In other words, the EIR node may transfer an EIR check response message of the UE to the AMF node. The AMF node may transfer the OSId of the UE to the PCF node, and the PCF node may determine an URSP rule to be installed in the UE, based on the OSId.

Hereinafter, a signal flow for obtaining the OSId of the UE from the EIR node will be described with reference to FIG. 15.

Figure 15:
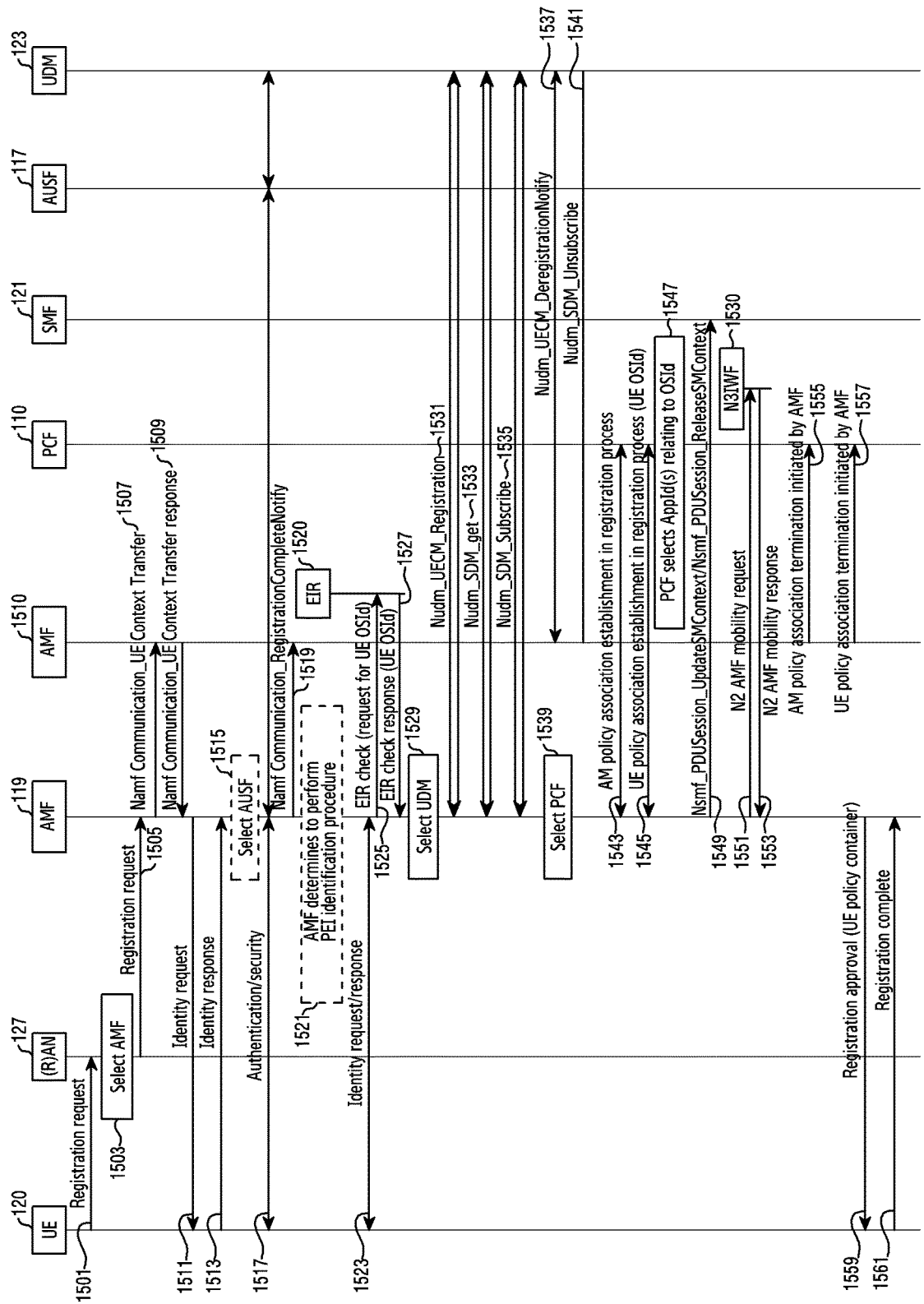
FIG. 15 illustrates a signal flow for obtaining an OSId of a UE from an EIR node in a wireless communication system according to various embodiments of the disclosure.

FIG. 15 illustrates a signal flow for obtaining an OSId of a UE from an EIR node in a wireless communication system according to various embodiments of the disclosure.

Referring to FIG. 15, in operation 1501, a UE 120 transmits a message for a registration request to a base station (e.g. the RAN 127). The UE 120 may transmit a request message for registration in a network to the base station.

In operation 1503, the base station performs AMF selection. For example, the base station may select an AMF node 119. In various embodiments, the AMF node 119 selected according to AMF selection in operation 1503 may be different from an AMF 1510 previously linked to (associated with) to the UE 120. The AMF node 119 may be called a new AMF, and the AMF 1510 may be called an old AMF.

In operation 1505, the base station transfers a message for a registration request to the AMF node 119. In other words, the base station may transfer a registration request message for registration of the UE 120 with respect to the network to the AMF node 119. For example, the base station may forward the registration request message received from the UE 120 in operation 1301, to the AMF node 119.

In operation 1507, the AMF node 119 transmits a message for UE context transfer to the AMF 1510. In other words, the AMF node 119 may transfers an Namf_Communication_UE_Context_Transfer message to the AMF 1510. In various embodiments, the AMF node 119 may request UE context information from the AFM 1510 through the Namf_Communication_UE_Context_Transfer message.

In operation 1509, the AMF 1510 transmits a message for UE context transfer response to the AMF node 119. In other words, the AMF 1510 may transfer an Namf_Communication_UE_Context_Transfer_Response message to the AMF node 119 in response in response to the Namf_Communication_UE_Context_Transfer message. In various embodiments, the AMF 1510 may transfer the UE context information to the AFM node 119 through the Namf_Communication_UE_Context_Transfer_Response message.

In operation 1511, the AMF node 119 transmits a message for requesting identity information of the UE 120 to the UE 120. In other words, the AMF node 119 may transfer an identity request message to the UE 120. For example, the AMF node 119 may request a subscription concealed identifier (SUCI) from the UE 120 through the identity request message.

In operation 1513, the UE 120 transmits an identity response message to the AMF node 119 in response to the identity request. For example, the UE 120 may transfer an identity response message including the SUCI requested by the AMF node 119, to the AMF node 119.

In operation 1515, the AMF node 119 performs AUSF selection. In other words, the AMF node 119 may select an AUSF node so as to initiate authentication of the UE 120. For example, the AMF node 119 may select an AUSF node 117 according to the AUSF selection.

In operation 1517, an authentication and security procedure is performed. For example, in operation 1517, an authentication and security procedure between the UE 120 and the AMF node 119, an authentication and security procedure between the AMF node 119 and the AUSF node 117, and an authentication and security procedure between the AUSF node 117 and an UDM node 117 may be performed.

In operation 1519, the AMF node 119 transmits a message for registration complete notification to the AMF node 1410. In other words, the AMF node 119 transfers an Namf_Communication_RegistrationCompleteNotify message to the AMF node 1410. For example, the AMF node 119 may notify the AMF node 1510 that registration of the UE 120 is complete in the AMF node 119, through the Namf_Communication_RegistrationCompleteNotify message.

In operation 1521, the AMF node 119 determines to perform a PEI identification procedure. The AMF node 119 may determine to perform PEI identification, based on configuration information at the time of initial registration.

In operation 1523, the AMF node 119 transmits an identity request message to the UE 120, and the UE 120 transmits an identity response message to the AMF node 119. The AMF node 119 may request a permanent equipment identifier (PEI) from the UE 120 through an identity request message, and the UE 120 may transfer an identity response message including the PEI to the AMF node 119.

In operation 1525, the AMF node 119 transmits a message for an EIR check request to an EIR node 1520. In other words, the AMF node 119 may transmit an EIR check request message to the EIR node 1520. The EIR check request message may include the PEI received from the UE 120. In various embodiments, the EIR check request message may include information for requesting the OSId of the UE 120. In other words, in operation 1525, the AMF node 119 may transmit a message for requesting the OSId of the UE 120, to the EIR node 1520 to request the OSId of the UE 120 from the EIR node 1520. The EIR node 1520 may check an EIR in response to the request from the AMF node 119, and may obtain the OSId of the UE 120 from the PEI by using an internal database. For example, the internal database may include, for example, a table showing mapping relationship (or linked relationship) between PEIs and OSIds, and the EIR node 1520 may search for an OSId corresponding to the PEI in the linked table or the mapping table, to obtain the OSId of the UE 120.

In operation 1527, the EIR node 1520 transmits a message for an EIR check response to the AMF node 119. In other words, the EIR node 1520 may transmit an EIR check response message to the AMF node 119. In various embodiments, the EIR check response message may include the OSId of the UE 120, and the EIR node 1520 may transfer the OSId of the UE 120 to the AMF node 119 through the EIR check response message.

In operation 1529, the AMF node 119 performs UDM selection. For example, the AMF node 119 may select the UDM node 123 according to the UDM selection.

In operation 1531, the AMF node 119 and the UDM node 123 perform UE context management (UECM) registration. In other words, the AMF node 119 and the UDM node 123 perform an Nudm_UECM_Registration procedure. In a UECM registration procedure, the AMF node 119 performs registration in the UDM node 123.

In operation 1533, the AMF node 119 and the UDM node 123 perform a subscriber data management (SDM) acquisition procedure. In other words, the AMF node 119 and the UDM node 123 perform an Nudm_SDM_get procedure. In the SDM acquisition procedure, the AMF node 119 may obtain access and mobility subscription data, SMF selection subscription data, and UE context from the UDM node 123.

In operation 1535, the AMF node 119 and the UDM node 123 perform a SDM subscription procedure. In other words, the AMF node 119 and the UDM node 123 perform an Nudm_SDM_Subscribe procedure. For example, the UDM node 123 may perform subscription by using the Nudm_SDM_Subscribe procedure for notification.

In operation 1537, the AMF node 119 performs PCF selection. For example, the AMF node 119 may select a PCF node 110 according to the PCF selection.

In operation 1539, the UDM node 123 transfers a message for UECM deregistration notification to the AMF node 1510. In other words, the UDM node 123 transfers an Nudm_UECM_DeregistrationNotify message to the AMF node 1510. According to the Nudm_UECM_DeregistrationNotify, the AMF node 1510 removes the UE context.

In operation 1541, the AMF node 119 transfers a message for SDM unsubscription to the UDM node 123. In other words, the AMF node 119 transfers an Nudm_SDM_Unsubscribe message to the UDM node 123. According to the Nudm_SDM_Unsubscribe, the AMF node 1510 releases the subscription to the UDM node 123.

In operation 1543, the AMF node 119 and the PCF node 110 perform a procedure for access and mobility (AM) policy association establishment in the registration process. The AMF node 119 may receive required information from the PCF node 110 to establish an AM policy association with respect to the UE 120.

In operation 1545, the AMF node 119 and the PCF node 110 perform a procedure for UE policy association establishment in the registration process. In various embodiments, the AMF node 119 may transfer the OSId of the UE 120 to the PCF node 110 through a UE policy association establishment request message in a UE policy association establishment process. In other words, the AMF node 119 may transmit a UE policy association establishment request message including the OSId of the UE 120 to the PCF node 110.

In operation 1547, the PCF node 110 selects at least one AppId relating to the OSId. For example, the PCF node 110 may determine a URSP rule to be installed in the UE 120, based on the OSId of the UE 120.

In operation 1549, the AMF node 119 may perform an Nsmf_PDUSession_UpdateSMContext or Nsmf_PDUSession_ReleaseSMContext procedure. For example, the AMF node 119 may request an SMF node 121 to update a PDU session for the UE 120 (Nsmf_PDUSession_UpdateSMContext), and/or may request the SMF node 121 to release a PDU session for the UE 120 (Nsmf_PDUSession_ReleaseSMContext).

In operation 1551, the AMF node 119 transmits a message for AMF mobility request to a non-3GPP inter-working function (N3IWF) node 1530. In other words, the AMF node 119 transfers an N2_AMF_Mobility_Request message to the N3IWF node 1530. In operation 1553, the N3IWF node 1530 transmits a message for AMF mobility response to the AMF node 119. In other words, the N3IWF node 1530 transfers an N2_AMF_Mobility_Response message to the AMF node 119 in response to the N2_AMF_Mobility_Request message. Through exchange between the N2_AMF_Mobility_Request message and the N2_AMF_Mobility_Response message, the AMF node 119 generates a next generation application protocol (NGAP) UE association toward the N3IWF node 1530 to which the UE 120 is connected.

In operation 1555, the AMF node 1410 performs an AM policy association termination procedure together with the PCF node 110. The AMF node 1510 may delete the AM policy association with the PCF node 110.

In operation 1557, the AMF node 1510 performs a UE policy association termination procedure together with the PCF node 110. The AMF node 1510 may delete the UE policy association with the PCF node 110.

In operation 1559, the AMF node 119 transfers a message for registration approval to the UE 120. In other words, the AMF node 119 may transfer a registration approval message to the UE 120. The registration approval message may include a UE policy container.

In operation 1561, the UE 120 transfers a registration complete message to the AMF node 119. Through the registration complete message, the UE 120 may notify the AMF node 119 that the UE 120 has been updated successfully.

In various embodiments, a PCF node may obtain the OSId of a UE, based on PEI information and relation information between a PEI and the OSId, which are stored in a UDR. Hereinafter, the acquisition of an OSId will be described in more detail with reference to FIG. 16.

Figure 16:
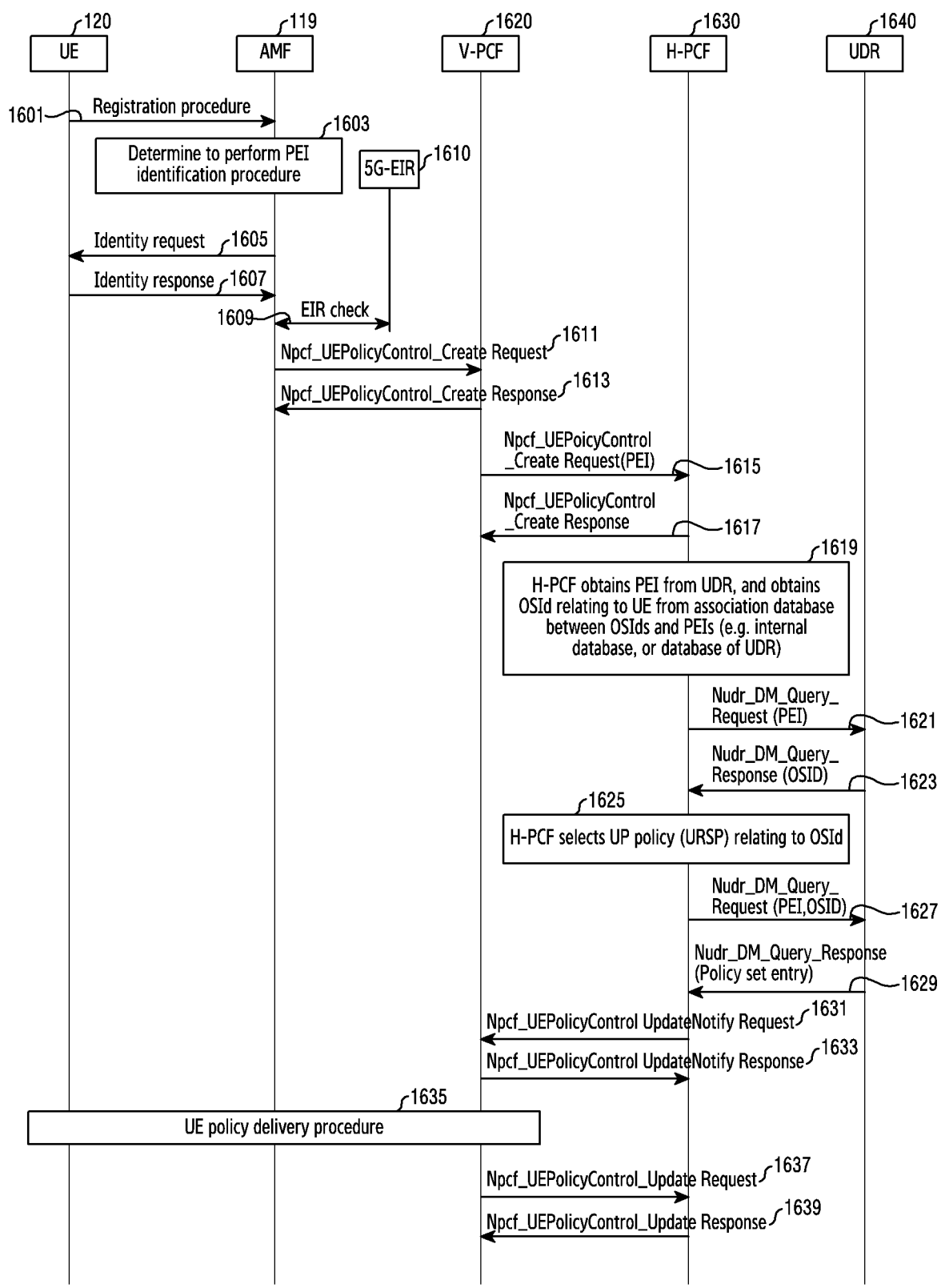
FIG. 16 illustrates a signal flow for obtaining an OSId of a UE, based on PEI information and relation information between a PEI and the OSId, which are stored in a UDR, in a wireless communication system according to various embodiments of the disclosure.

FIG. 16 illustrates a signal flow for obtaining an OSId of a UE, based on PEI information and relation information between a PEI and the OSId, which are stored in a UDR, in a wireless communication system according to various embodiments of the disclosure. In FIG. 16, each of a V-PCF node 1620 and/or an H-PCF node 1630 may be a PCF node 110.

Referring to FIG. 16, in operation 1601, a UE 120 transmits a message for a registration request to an AMF node 119. The UE 120 may transmit a request message for registration in a network to the AMF node 119. The registration request message in operation 1601 may be a message for an initial registration request.

In operation 1603, the AMF node 119 determines to perform a PEI identification procedure. The AMF node 119 identifies whether a UE policy is executed, and if the UE policy is required to be executed, the AMF node determines to perform the PEI identification procedure. For example, the AMF node 119 may determine to perform PEI identification, based on configuration information at the time of initial registration.

In operation 1605, the AMF node 119 transfers an identity request message to the UE 120. The AMF node 119 may request a permanent equipment identifier (PEI) to the UE 120 through the identity request message.

In operation 1607, the UE 120 transmits an identity response message to the AMF node 119. The UE 120 may transfer an identity response message including the PEI to the AMF node 119.

In operation 1609, the AMF node 119 and an equipment identity register (EIR) node 1610 perform EIR check. For example, the AMF node 119 may identify that relation information between the PEI and an SUPI is proper, through the EIR node 1610.

In operation 1611, the AMF node 119 transmits an Npcf_UEPolicyControl_Create_Request message to the V-PCF node 1620. The AMF node 119 having determined that execution of a UE policy is required may transfer an Npcf_UEPolicyControl_Create_Request message or a UE policy control association request message to the V-PCF node 1620. In various embodiments, the Npcf_UEPolicyControl_Create_Request message or the UE policy control association request message may include at least one of the SUPI and the PEI.

In operation 1613, the V-PCF node 1620 transmits an Npcf_UEPolicyControl_Create_Response message to the AMF node 119. The Npcf_UEPolicyControl_Create_Response message may be transmitted in response to the Npcf_UEPolicyControl_Create_Request message in operation 1611.

Under a roaming situation, in operation 1615, the V-PCF node 1620 transfers an Npcf_UEPolicyControl_Create_Response message to the H-PCF node 1630. In various embodiments, the Npcf_UEPolicyControl_Create_Response message may include the PEI.

In operation 1617, the H-PCF node 1630 transmits an Npcf_UEPolicyControl_Create_Response message to the V-PCF node 1620. The Npcf_UEPolicyControl_Create_Response message may be transmitted in response to the Npcf_UEPolicyControl_Create_Request message in operation 1615.

In operation 1619, the H-PCF node 1630 obtains an OSId relating to the UE 120 by using a relation database between OSIds and PEIs. For example, the relation database between OSIds and PEIs may include, for example, a table showing mapping relationship (or linked relationship) between PEIs and OSIds, and the H-PCF node 1630 may search for an OSId corresponding to the PEI in the linked table or the mapping table. The H-PCF node 1630 may identify UE manufacturer information and information such as a sequence number from an internal database of the H-PCF node 1630, based on the PEI obtained from the AMF node 119, and may obtain an OSId corresponding to the identified information.

As another example, if OSId and PEI information relating to a SUPI is stored in a UDR node 1640, the H-PCF node 1630 may obtain a PEI from the UDR node 1640, based on the SUPI obtained from the AMF node 119, through an Nudr_DM_QueryRequest message in operation 1621 and an Nudr_DM_QueryResponse message in operation 1623. Further, the H-PCF node 1630 may identify whether the PEI obtained through the PEI identification procedure for the UE 120 is identical to the PEI stored in the UDR node 1640. If the PEIs are the same, the H-PCF node may obtain an OSId stored in the UDR node 1640. For example, the H-PCF node 1630 may search for an OSId corresponding to a PEI in a mapping table or relation table stored in a UDR.

In operation 1625, the H-PCF node 1630 selects a URSP relating to the OSId. The H-PCF node 1630 may determine a URSP including a traffic descriptor suitable for an OS corresponding to the OSId.

As another example, in operation 1627, the H-PCF node 1630 may transfer an Nudr_DM_Query_Request message including a PEI and an OSId to the UDR node 1640. In operation 1629, the H-PCF node may receive a URSP rule (and/or a policy set entry) including a traffic descriptor corresponding to the OSId from the UDR node 1640 through an Nudr_DM_QueryResponse message.

In operation 1631, the H-PCF node 1630 transmits an Npcf_UEPolicyControl_UpdtaeNotify_Request message to the V-PCF node 1620. The Npcf_UEPolicyControl_UpdtaeNotify_Request message may include the URSP rule including the traffic descriptor corresponding to the OSId of the UE 120.

In operation 1633, the V-PCF node 1620 transmits an Npcf_UEPolicyControl_UpdtaeNotify_Response message to the H-PCF node 1630 in response to the Npcf_UEPolicyControl_UpdtaeNotify_Request message.

In operation 1635, the V-PCF node 1630 performs a UE policy delivery procedure. In the UE policy delivery procedure, the V-PCF node 1630 may transfer the URSP rule including the traffic descriptor corresponding to the OSId of the UE 120 to the UE 120. In various embodiments, the UE policy delivery procedure in operation 1635 may be performed after the UE 120 has been registered in the network (i.e. the UE 120 has transmitted a registration complete message to the AMF node 119).

In operation 1637, the V-PCF node 1620 transmits an Npcf_UEPolicyControl_UpdateRequest message to the H-PCF node 1630. In operation 1639, the H-PCF node 1630 transmits an Npcf_UEPolicyControl_UpdateResponse message to the V-PCF node 1620 in response to the Npcf_UEPolicyControl_UpdateRequest message.

In various embodiments, an AMF node may determine whether to perform a PEI identification procedure, based on an indicator received from a UDM node.

More specifically, if the AMF node receives a registration request message in a process of registration of a UE, the AMF node identifies UDR information through the UDM node. An indicator (hereinafter, referred to as a PEI identification indicator) indicating whether execution of a PEI identification procedure is required is stored in a UDR, and the UDR information may include the indicator indicating whether execution of the PEI identification procedure is required. In various embodiments, the PEI identification indicator may express whether a UE policy is applied. If the AMF node receives the PEI identification indicator, or an indicator expressing application of a UE policy from the UDM node, the AMF node may determine to perform a PEI identification procedure.

Hereinafter, a signal flow for performing a PEI identification procedure, based on an indicator received from the UDM node will be described with reference to FIG. 17.

Figure 17:
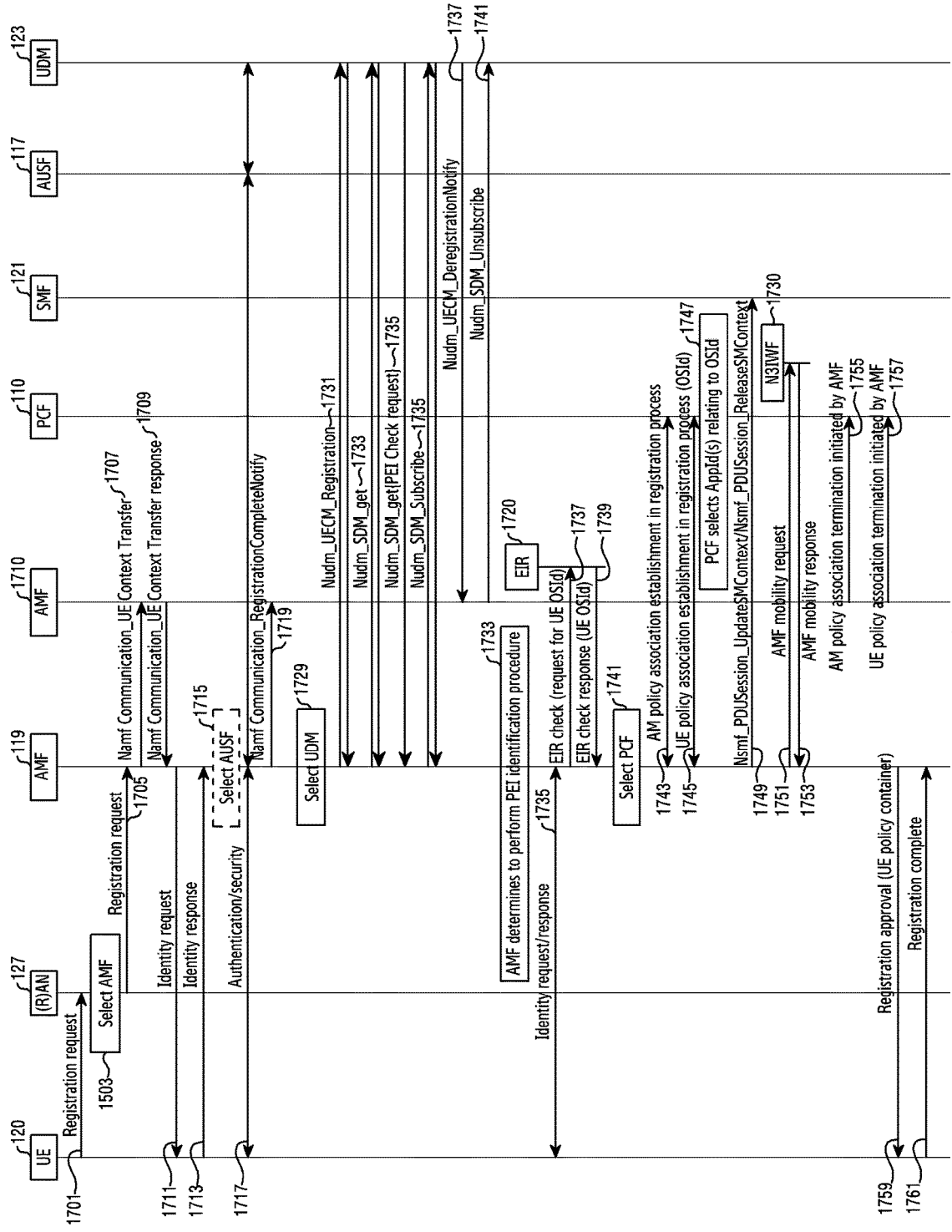
FIG. 17 illustrates a signal flow for performing a PEI identification procedure, based on an indicator received from a UDM node in a wireless communication system according to various embodiments of the disclosure.

FIG. 17 illustrates a signal flow for performing a PEI identification procedure, based on an indicator received from a UDM node in a wireless communication system according to various embodiments of the disclosure.

Referring to FIG. 17, in operation 1701, a UE 120 transmits a message for a registration request to a base station (e.g. the RAN 127). The UE 120 may transmit a request message for registration in a network to the base station.

In operation 1703, the base station performs AMF selection. For example, the base station may select an AMF node 119. In various embodiments, the AMF node 119 selected according to AMF selection in operation 1703 may be different from an AMF 1710 previously linked to (associated with) to the UE 120. The AMF node 119 may be called a new AMF, and the AMF 1710 may be called an old AMF.

In operation 1705, the base station transfers a message for a registration request to the AMF node 119. In other words, the base station may transfer a registration request message for registration of the UE 120 with respect to the network to the AMF node 119. For example, the base station may forward the registration request message received from the UE 120 in operation 1701, to the AMF node 119.

In operation 1707, the AMF node 119 transmits a message for UE context transfer to the AMF 1710. In other words, the AMF node 119 may transfers an Namf_Communication_UE_Context_Transfer message to the AMF 1710. In various embodiments, the AMF node 119 may request UE context information from the AFM 1710 through the Namf_Communication_UE_Context_Transfer message.

In operation 1709, the AMF 1510 transmits a message for UE context transfer response to the AMF node 119. In other words, the AMF 1710 may transfer an Namf_Communication_UE_Context_Transfer_Response message to the AMF node 119 in response in response to the Namf_Communication_UE_Context_Transfer message. In various embodiments, the AMF 1710 may transfer the UE context information to the AFM node 119 through the Namf_Communication_UE_Context_Transfer_Response message.

In operation 1711, the AMF node 119 transmits a message for requesting identity information of the UE 120 to the UE 120. In other words, the AMF node 119 may transfer an identity request message to the UE 120. For example, the AMF node 119 may request a subscription concealed identifier (SUCI) from the UE 120 through the identity request message.

In operation 1713, the UE 120 transmits an identity response message to the AMF node 119 in response to the identity request. For example, the UE 120 may transfer an identity response message including the SUCI requested by the AMF node 119, to the AMF node 119.

In operation 1715, the AMF node 119 performs AUSF selection. In other words, the AMF node 119 may select an AUSF node so as to initiate authentication of the UE 120. For example, the AMF node 119 may select an AUSF node 117 according to the AUSF selection.

In operation 1717, an authentication and security procedure is performed. For example, in operation 1717, an authentication and security procedure between the UE 120 and the AMF node 119, an authentication and security procedure between the AMF node 119 and the AUSF node 117, and an authentication and security procedure between the AUSF node 117 and an UDM node 117 may be performed.

In operation 1719, the AMF node 119 transmits a message for registration complete notification to the AMF node 1710. In other words, the AMF node 119 transfers an Namf_Communication_RegistrationCompleteNotify message to the AMF node 1710. For example, the AMF node 119 may notify the AMF node 1710 that registration of the UE 120 is complete in the AMF node 119, through the Namf_Communication_RegistrationCompleteNotify message.

In operation 1721, the AMF node 119 performs UDM selection. For example, the AMF node 119 may select the UDM node 123 according to the UDM selection.

In operation 1723, the AMF node 119 and the UDM node 123 perform UE context management (UECM) registration. In other words, the AMF node 119 and the UDM node 123 perform an Nudm_UECM_Registration procedure. In a UECM registration procedure, the AMF node 119 performs registration in the UDM node 123.

In operation 1725, the AMF node 119 and the UDM node 123 perform a subscriber data management (SDM) acquisition procedure. In other words, the AMF node 119 and the UDM node 123 perform an Nudm_SDM_get procedure. In the SDM acquisition procedure, the AMF node 119 may obtain access and mobility subscription data, SMF selection subscription data, and UE context from the UDM node 123. According to various embodiments, the AMF node 119 may obtain UDR information in the SDM acquisition procedure. The UDR information may include an indicator (i.e. a PEI identification indicator) indicating whether execution of a PEI identification procedure is required. A PEI identification indicator may indicate whether a UE policy is applied.

In operation 1727, the AMF node 119 and the UDM node 123 perform a SDM subscription procedure. In other words, the AMF node 119 and the UDM node 123 perform an Nudm_SDM_Subscribe procedure. For example, the UDM node 123 may perform subscription by using the Nudm_SDM_Subscribe procedure for notification.

In operation 1729, the UDM node 123 transfers a message for UECM deregistration notification to the AMF node 1710. In other words, the UDM node 123 transfers an Nudm_UECM_DeregistrationNotify message to the AMF node 1710. According to the Nudm_UECM_DeregistrationNotify, the AMF node 1710 removes the UE context.

In operation 1731, the AMF node 1710 transfers a message for SDM unsubscription to the UDM node 123. In other words, the AMF node 1710 transfers an Nudm_SDM_Unsubscribe message to the UDM node 123. According to the Nudm_SDM_Unsubscribe, the AMF node 1710 releases the subscription to the UDM node 123.

In operation 1733, the AMF node 119 determines to perform a PEI identification procedure. In various embodiments, the AMF node 119 may determine to perform a PEI identification procedure, based on a PEI identification indicator and/or an indicator indicating UE policy application, which are obtained from the UDM node 123. For example, if the PEI identification indicator indicates that execution of a PEI identification procedure is required, the AMF node 119 may determine to perform the PEI identification procedure. As another example, if the PEI identification indicator indicates that execution of a PEI identification procedure is not required, the AMF node 119 may determine not to perform the PEI identification procedure.

In operation 1735, the AMF node 119 transmits an identity request message to the UE 120, and the UE 120 transmits an identity response message to the AMF node 119. The AMF node 119 may request a permanent equipment identifier (PEI) from the UE 120 through an identity request message, and the UE 120 may transfer an identity response message including the PEI to the AMF node 119.

In operation 1737, the AMF node 119 transmits a message for an EIR check request to an EIR node 1720. In other words, the AMF node 119 may transmit an EIR check request message to the EIR node 1720. The EIR check request message may include the PEI received from the UE 120. In various embodiments, the EIR check request message may include information for requesting the OSId of the UE 120. In other words, in operation 1725, the AMF node 119 may transmit a message for requesting the OSId of the UE 120, to the EIR node 1720 to request the OSId of the UE 120 from the EIR node 1720. The EIR node 1720 may check an EIR in response to the request from the AMF node 119, and may obtain the OSId of the UE 120 from the PEI by using an internal database. For example, the internal database may include, for example, a table showing mapping relationship (or linked relationship) between PEIs and OSIds, and the EIR node 1720 may search for an OSId corresponding to the PEI in the linked table or the mapping table, to obtain the OSId of the UE 120.

In operation 1739, the EIR node 1720 transmits a message for an EIR check response to the AMF node 119. In other words, the EIR node 1720 may transmit an EIR check response message to the AMF node 119. In various embodiments, the EIR check response message may include the OSId of the UE 120, and the EIR node 1720 may transfer the OSId of the UE 120 to the AMF node 119 through the EIR check response message.

In operation 1741, the AMF node 119 performs PCF selection. For example, the AMF node 119 may select a PCF node 110 according to the PCF selection.

In operation 1743, the AMF node 119 and the PCF node 110 perform a procedure for access and mobility (AM) policy association establishment in the registration process. The AMF node 119 may receive required information from the PCF node 110 to establish an AM policy association with respect to the UE 120.

In operation 1745, the AMF node 119 and the PCF node 110 perform a procedure for UE policy association establishment in the registration process. In various embodiments, the AMF node 119 may transfer the OSId of the UE 120 to the PCF node 110 through a UE policy association establishment request message in a UE policy association establishment process. In other words, the AMF node 119 may transmit a UE policy association establishment request message including the OSId of the UE 120 to the PCF node 110.

In operation 1747, the PCF node 110 selects at least one AppId relating to the OSId. For example, the PCF node 110 may determine a URSP rule to be installed in the UE 120, based on the OSId of the UE 120.

In operation 1749, the AMF node 119 may perform an Nsmf_PDUSession_UpdateSMContext or Nsmf_PDUSession_ReleaseSMContext procedure. For example, the AMF node 119 may request an SMF node 121 to update a PDU session for the UE 120 (Nsmf_PDUSession_UpdateSMContext), and/or may request the SMF node 121 to release a PDU session for the UE 120 (Nsmf_PDUSession_ReleaseSMContext).

In operation 1751, the AMF node 119 transmits a message for AMF mobility request to a non-3GPP inter-working function (N3IWF) node 1730. In other words, the AMF node 119 transfers an N2_AMF_Mobility_Request message to the N3IWF node 1730. In operation 1753, the N3IWF node 1730 transmits a message for AMF mobility response to the AMF node 119. In other words, the N3IWF node 1730 transfers an N2_AMF_Mobility_Response message to the AMF node 119 in response to the N2_AMF_Mobility_Request message. Through exchange between the N2_AMF_Mobility_Request message and the N2_AMF_Mobility_Response message, the AMF node 119 generates a next generation application protocol (NGAP) UE association toward the N3IWF node 1730 to which the UE 120 is connected.

In operation 1755, the AMF node 1710 performs an AM policy association termination procedure together with the PCF node 110. The AMF node 1710 may delete the AM policy association with the PCF node 110.

In operation 1757, the AMF node 1710 performs a UE policy association termination procedure together with the PCF node 110. The AMF node 1710 may delete the UE policy association with the PCF node 110.

In operation 1759, the AMF node 119 transfers a message for registration approval to the UE 120. In other words, the AMF node 119 may transfer a registration approval message to the UE 120. The registration approval message may include a UE policy container.

In operation 1761, the UE 120 transfers a registration complete message to the AMF node 119. Through the registration complete message, the UE 120 may notify the AMF node 119 that the UE 120 has been updated successfully.

Figure 18:
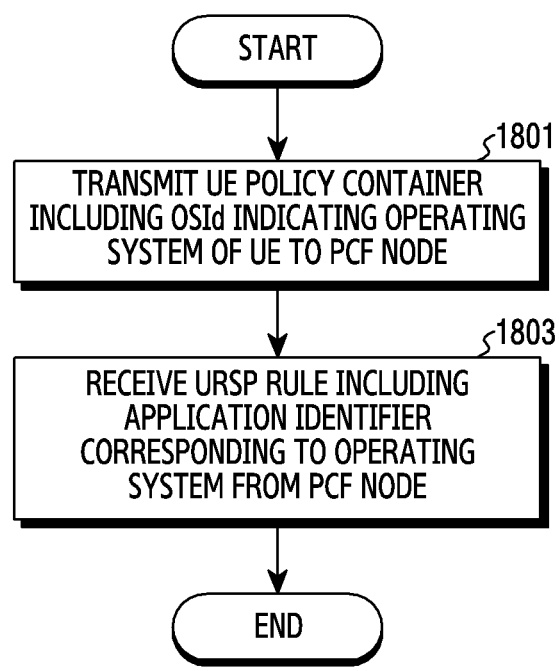
FIG. 18 illustrates a flowchart of a UE for transferring an OSId in a wireless communication system according to various embodiments of the disclosure.

FIG. 18 illustrates a flowchart of a UE for transferring an OSId in a wireless communication system according to various embodiments of the disclosure. FIG. 18 illustrates an example of an operating method of the UE 120.

Referring to FIG. 18, in operation 1801, a UE transmits a UE policy container including an operating system identifier (OSId) indicating the operating system of the UE to a policy control function (PCF) node. The OSId may be an identifier identifying the operating system of the UE. When the OSId is received from the UE in the UE policy container, the PCF node may store the OSId in a UDR by using Nudr_DM_Create including data set "Policy data" and data subset "UE context policy control data" (the PCF stores the OSId in the UDR using Nudr_DM_Create including DataSet "Policy Data" and Data Subset "UE context policy control data" when the OSId is received from the UE in the UE Policy container).

In operation 1803, the UE receives a UE route selection policy (URSP) rule including an application identifier corresponding to the operating system from the PCF node. For example, if the PCF node determines the operating system of the UE, and is required to transfer a URSP rule including an application ID as a traffic descriptor, the traffic descriptor of the URSP rule may include an application ID associated with the operating system determined by the PCF node (If the (H-)PCF determines the operating system of the UE and if the (H-)PCF requires to deliver URSP rules that contain Application ID as Traffic Descriptors, then the Traffic Descriptors of such URSP rules include the Application ID associated with the operating system determined by the PCF).

In various embodiments, the operating system may be identified by the PCF node, based on at least one of the OSId or a permanent equipment identifier (PEI) of the UE. For example, the PCF node may use a PEI provided from an AMF, and/or the OSId provided from the UE, in order to determine the operating system of the UE (The (H-)PCF may use the PEI provided by the AMF and/or the OSId provided by the UE, to determine the operating system of the UE).

In various embodiments, the OSId may be transmitted from the UE through a registration request message (registration message) in an initial registration procedure, and the operating system may be determined by the PCF node, based on the OSId.

In various embodiments, the UE may receive an identity request message for requesting a PEI, from an access management function (AMF) node, and the UE may transmit an identity response message including the PEI to the AMF node in response to the identity request message. An identity request procedure as described above may be initiated by the AMF transmitting an identity request message for extracting the PEI to the UE (the Identity Request procedure is initiated by AMF sending an Identity Request message to the UE to retrieve the PEI). The PEI may be provided from the AMF node to the PCF node, and the operating system may be determined by the PCF node, based on the PEI.

In various embodiments, the OSId may be stored in a user data repository (UDR) by the PCF node.

In various embodiments, the OSId may be transmitted from the UE to an access management function (AMF) node through a registration request message, and the OSId may be transmitted from the AMF node to the PCF node through a message for a UE policy generation request (UE policy control create request). For example, the AMF node may transmit an Npcf_UEPolicyControl Create Request including a UE policy container including the OSId to a V-PCF, and the V-PCF may forward such information received from the AMF, to an H-PCF (The AMF sends an Npcf_UEPolicyControl Create Request with the following information: UE Policy Container (including operating system identifier), and the V-PCF forwards the information received from AMF in step 2 to the H-PCF).

In various embodiments, the UE may receive an identity request message for requesting a PEI, from an access management function (AMF) node, and the UE may transmit an identity response message including the PEI and the OSId to the AMF node in response to the identity request message. The OSId may be provided from the AMF node to the PCF node.

In various embodiments, the OSId may be identified from the PEI by the PCF, based on mapping relationship between PEIs and OSIds.

Figure 19:
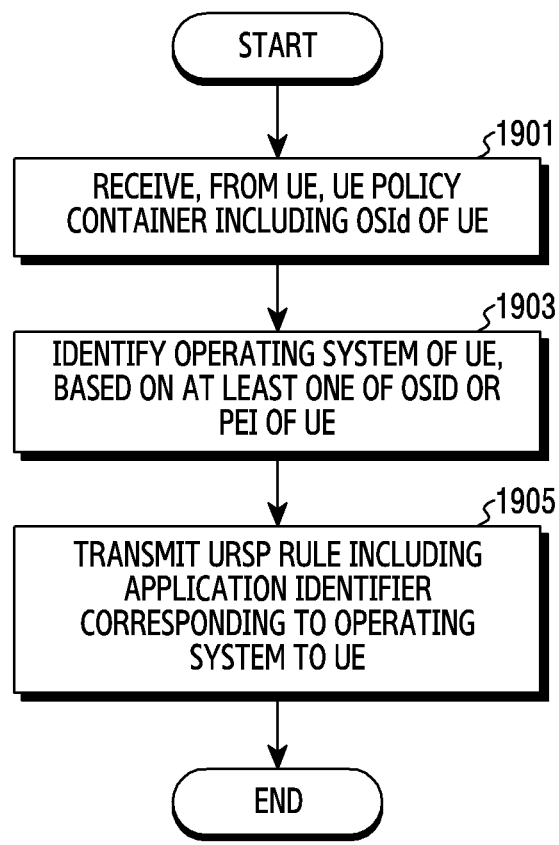
FIG. 19 illustrates a flowchart of a PCF node for identifying an operating system of a UE in a wireless communication system according to various embodiments of the disclosure.

FIG. 19 illustrates a flowchart of a PCF node for identifying an operating system of a UE in a wireless communication system according to various embodiments of the disclosure. FIG. 19 illustrates an example of an operating method of the PCF node 110.

Referring to FIG. 19, in operation 1901, the PCF node receives, from a user equipment (UE), a UE policy container including an operating system identifier (OSId) of the UE. The OSId may be an identifier identifying the operating system of the UE. When the OSId is received from the UE in the UE policy container, the PCF node may store the OSId in a UDR by using Nudr_DM_Create including data set "Policy data" and data subset "UE context policy control data" (the PCF stores the OSId in the UDR using Nudr_DM_Create including DataSet "Policy Data" and Data Subset "UE context policy control data" when the OSId is received from the UE in the UE Policy container).

In operation 1903, the PCF node identifies the operating system of the UE, based on at least one of the OSId or a permanent equipment identifier (PEI) of the UE. For example, the PCF node may use a PEI provided from an AMF, and/or the OSId provided from the UE, in order to determine the operating system of the UE (The (H-)PCF may use the PEI provided by the AMF and/or the OSId provided by the UE, to determine the operating system of the UE).

In operation 1905, the PCF node transmits a UE route selection policy (URSP) rule including an application identifier corresponding to the operating system to the UE. For example, if the PCF node determines the operating system of the UE, and is required to transfer a URSP rule including an application ID as a traffic descriptor, the traffic descriptor of the URSP rule may include an application ID associated with the operating system determined by the PCF node (If the (H-)PCF determines the operating system of the UE and if the (H-)PCF requires to deliver URSP rules that contain Application ID as Traffic Descriptors, then the Traffic Descriptors of such URSP rules include the Application ID associated with the operating system determined by the PCF).

In various embodiments, the OSId may be transmitted from the UE through a registration request message in an initial registration procedure. The PCF node may determine the operating system, based on the OSId.

In various embodiments, the PCF node may receive a PEI from an access management function (AMF) node, and may identify the operating system of the UE, based on the PEI. The PEI may be transmitted from the UE to the AMF node through an identity response message, and the identity response message may be transmitted from the UE to the AMF node in response to an identity request message for requesting the PEI, transmitted from the AMF node. An identity request procedure as described above may be initiated by the AMF transmitting an identity request message for extracting the PEI to the UE (the Identity Request procedure is initiated by AMF sending an Identity Request message to the UE to retrieve the PEI). The PEI may be provided from the AMF node to the PCF node, and the operating system may be determined by the PCF node, based on the PEI.

In various embodiments, the PCF node may store the OSId in a user data repository (UDR).

In various embodiments, the PCF node may receive, from an access management function (AMF) node, a UE policy generation request (UE policy control create request) message including the OSId. The OSId may be transmitted from the UE to the access management function (AMF) node through a registration request message. For example, the AMF node may transmit an Npcf_UEPolicyControl Create Request including a UE policy container including the OSId to a V-PCF, and the V-PCF may forward such information received from the AMF, to an H-PCF (The AMF sends an Npcf_UEPolicyControl Create Request with the following information: UE Policy Container (including operating system identifier), and the V-PCF forwards the information received from AMF in step 2 to the H-PCF).

In various embodiments, the PCF node may identify an OSId from a PEI, based on mapping relationship between PEIs and OSIds.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method for operating a user equipment (UE) in a wireless communication system, the method comprising:

receiving, from an access and mobility management function (AMF) node, an identity request message for requesting a permanent equipment identifier (PEI) of the UE;

transmitting, to the AMF node, the PEI of the UE; and receiving, from a policy control function (PCF) node, a UE route selection policy (URSP) rule associated with an operating system of the UE, wherein the operating system of the UE is based on the PEI of the UE, wherein the URSP rule includes an application identifier related to the operating system of the UE and a validation criteria associated with a validity of the URSP rule, and wherein the validation criteria includes at least one of time criteria or location criteria.

2. The method of claim 1, wherein an operating system identifier (OSId) of the UE is identified from the PEI by the PCF, based on mapping relationship between PEIs and OSIds.

3. The method of claim 2, wherein the OSId is stored in a user data repository (UDR).

4. A method for operating a policy control function (PCF) node in a wireless communication system, the method comprising:

receiving, from an access and mobility management function (AMF) node, a permanent equipment identifier (PEI) of a user equipment (UE);

obtaining an operating system of the UE, based on the PEI of the UE; and transmitting, to the UE, a UE route selection policy (URSP) rule associated with the operating system of the UE, wherein the URSP rule includes an application identifier related to the operating system of the UE and a validation criteria associated with a validity of the URSP rule, and wherein the validation criteria includes at least one of time criteria or location criteria.

5. The method of claim 4, wherein the PEI of the UE is transmitted from the UE to the AMF node, in response to an identity request message for requesting the PEI, which is transmitted from the AMF node.

6. The method of claim 4, further comprising:

identifying an operating system identifier (OSId) of the UE from the PEI, based on mapping relationship between PEIs and OSIds.

7. The method of claim 6, further comprising:

storing the OSId in a user data repository (UDR).

8. A user equipment (UE) in a wireless communication system, the UE comprising:

a transceiver; and at least one processor functionally coupled to the transceiver, and configured to control the transceiver, wherein the at least one processor is configured to:

receive, from an access and mobility management function (AMF) node, an identity request message for requesting a permanent equipment identifier (PEI) of the UE, transmit, to the AMF node, the PEI of the UE, and receive, from a policy control function (PCF) node, a UE route selection policy (URSP) rule associated with an operating system of the UE, wherein the operating system of the UE is based on the PEI of the UE, wherein the URSP rule includes an application identifier related to the operating system of the UE and a validation criteria associated with a validity of the URSP rule, and wherein the validation criteria includes at least one of time criteria or location criteria.

9. The UE of claim 8, wherein an operating system identifier (OSId) is identified from the PEI by the PCF, based on mapping relationship between PEIs and OSIds.

10. The UE of claim 9, wherein the OSId is stored in a user data repository (UDR).

* * * * *